(12) United States Patent
Missry

(10) Patent No.: US 6,862,843 B2
(45) Date of Patent: Mar. 8, 2005

(54) UMBRELLA PLANTER WITH A SNAP-ON BASE

(75) Inventor: Ezra Missry, Dunellen, NJ (US)

(73) Assignee: Misco Enterprises, Inc., Dunellen, NJ (US)

( * ) Notice: Subject to any disclaimer, the term of this patent is extended or adjusted under 35 U.S.C. 154(b) by 10 days.

(21) Appl. No.: 10/410,372

(22) Filed: Apr. 9, 2003

(65) Prior Publication Data

US 2004/0216376 A1 Nov. 4, 2004

(51) Int. Cl.$^7$ .............................. A01G 9/02; A01G 9/04
(52) U.S. Cl. .............................. 47/66.6; 47/71; 47/66.7; 47/83; 47/67; 47/65.5
(58) Field of Search .............................. 47/66.6, 66.7, 47/71, 83, 65.5, 66.1, 67, 68; 135/16

(56) References Cited

U.S. PATENT DOCUMENTS

| | | | | |
|---|---|---|---|---|
| 3,442,420 A | * | 5/1969 | Edwards | 206/520 |
| 3,838,772 A | * | 10/1974 | Lang et al. | 206/520 |
| 4,208,836 A | * | 6/1980 | Kramer | 47/72 |
| 4,597,221 A | * | 7/1986 | Adair et al. | 47/66.6 |
| 4,912,875 A | * | 4/1990 | Tardif | 47/71 |
| 5,259,141 A | * | 11/1993 | D'Alessandro | 47/39 |
| 5,481,826 A | * | 1/1996 | Dickinson et al. | 47/39 |
| 5,493,976 A | * | 2/1996 | Hammond | 108/50.12 |
| 5,638,638 A | * | 6/1997 | Moskowitz | 47/71 |
| 5,644,867 A | * | 7/1997 | Gay | 47/71 |
| 5,960,587 A | * | 10/1999 | Brasseur et al. | 47/86 |
| 5,967,359 A | * | 10/1999 | Mindell | 220/475 |
| 6,085,459 A | * | 7/2000 | Conner | 47/41.01 |
| 6,161,333 A | * | 12/2000 | Poston | 47/86 |

FOREIGN PATENT DOCUMENTS

| | | | | |
|---|---|---|---|---|
| GB | 2364876 A | * | 2/2002 | A01G/9/02 |

* cited by examiner

Primary Examiner—Peter M. Poon
Assistant Examiner—Andrea M. Valenti
(74) Attorney, Agent, or Firm—Ezra Sutton

(57) ABSTRACT

An umbrella planter having a snap-on lower water reservoir base member and a center sleeve tube for use with an umbrella-type patio table having a table top with a centrally located opening for receiving an umbrella pole of an umbrella assembly. The umbrella planter includes an upper planter member and a lower water reservoir base member. The lower water reservoir base member includes a side wall having an upper perimeter lip and a bottom base wall; and includes a hollow center sleeve connected to the bottom base wall and having a central sleeve opening for receiving the umbrella pole therethrough; and the bottom base wall also includes an upper surface and a lower surface. The upper surface of the bottom base wall of the lower base member includes first connecting means for connecting and mating the lower base member to the upper planter member. The upper planter member includes a side wall having an upper perimeter edge, and a bottom planter wall having a plurality of water ventilation slots; the bottom planter wall has a centralized pedestal section connected thereto; and also the bottom planter wall has an upper surface and a lower surface. The pedestal section includes an inner cylindrical wall forming a sleeve receiving passageway for receiving the hollow center sleeve therein; the inner cylindrical wall having a plurality of downwardly protruding hollow legs being integrally attached thereto.

28 Claims, 19 Drawing Sheets

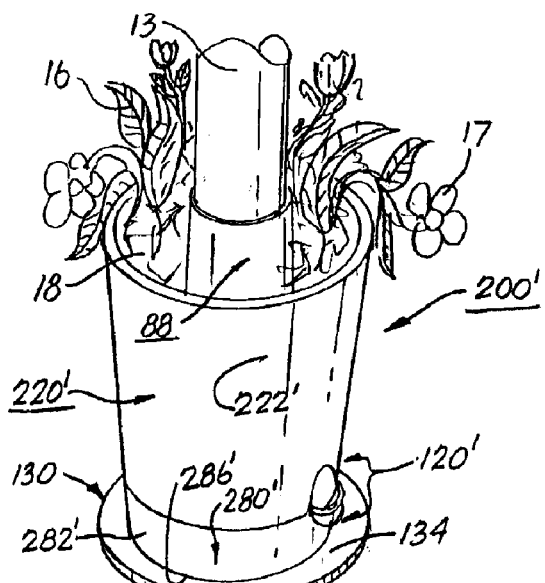
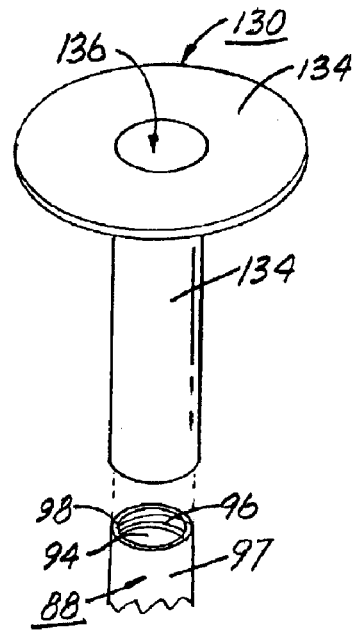
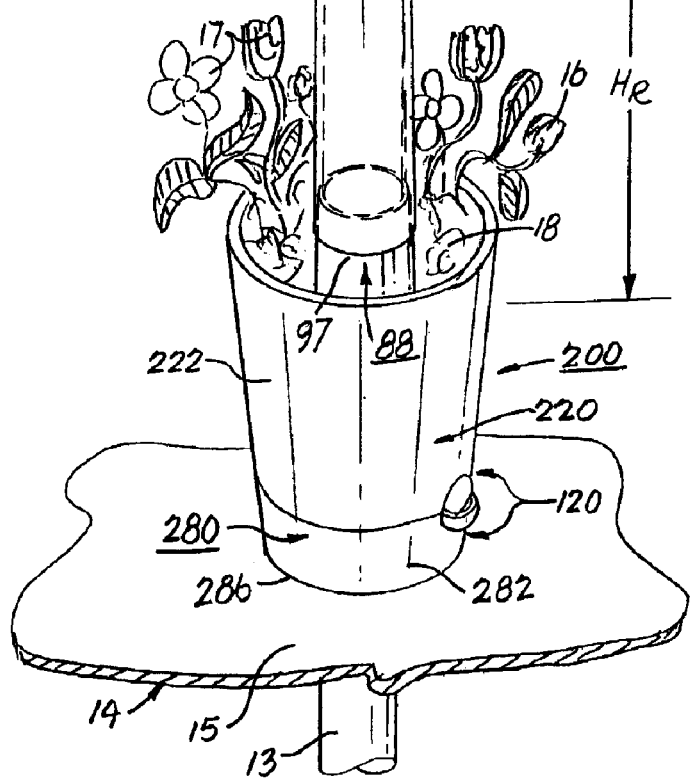
FIG. 13
FIG. 13A

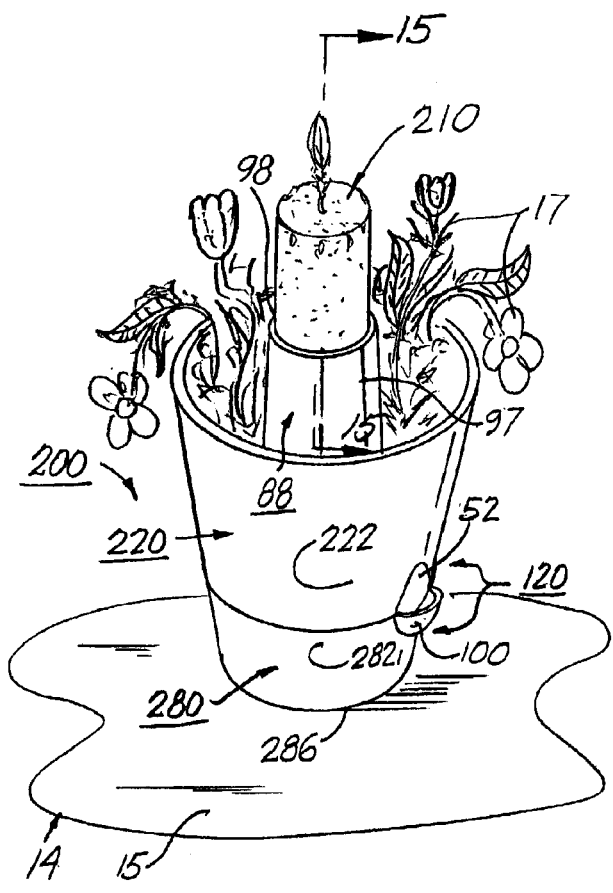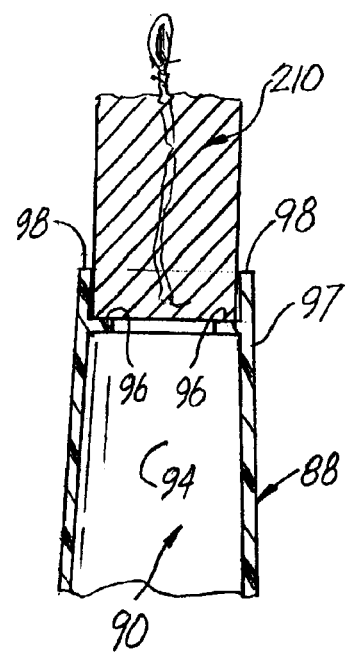
FIG. 14
FIG. 15

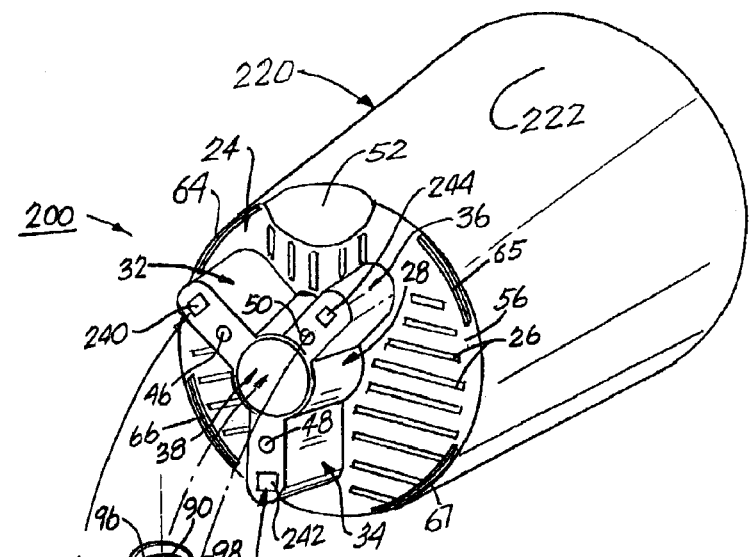
FIG. 16A
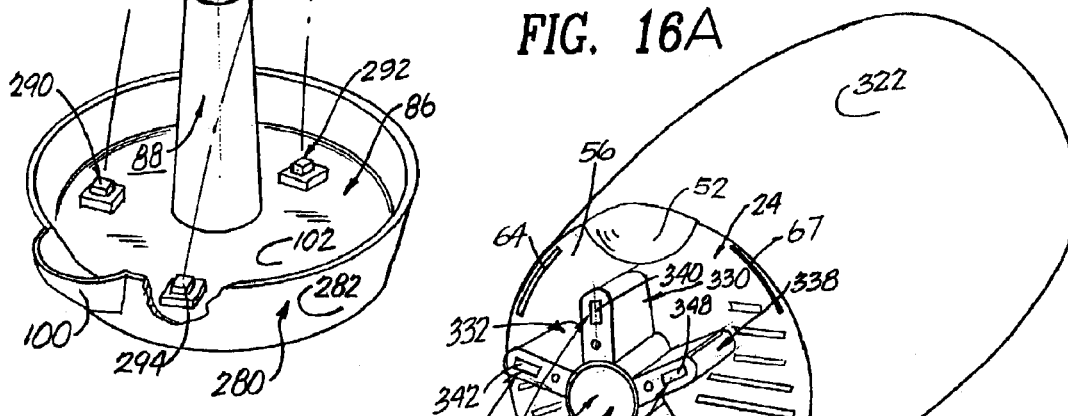
FIG. 17A
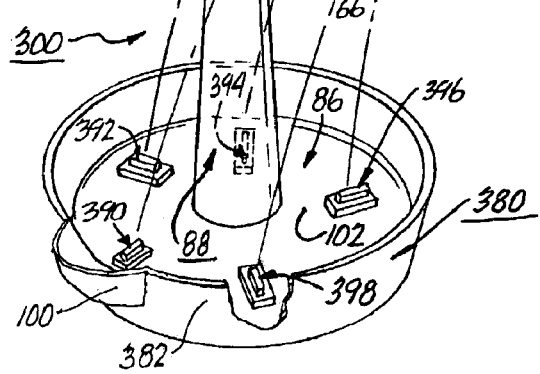

UMBRELLA PLANTER WITH A SNAP-ON BASE

FIELD OF THE INVENTION

The present invention relates to an umbrella planter having a snap-on base that is adapted for encircling an umbrella pole for use with an umbrella-type patio table. More particularly, the umbrella planter has a centrally located hollow center tubular sleeve with a central sleeve opening for receiving the umbrella pole there through, such that the umbrella planter is centrally positioned on the patio table top and the umbrella pole is extended through the central sleeve opening of the planter housing.

BACKGROUND OF THE INVENTION

Presently, umbrella-type patio tables have become very popular for use in home backyards, pool areas, private gardens and on private patios, as well as at restaurants, cafes, swim clubs, golf and tennis clubs, hotels, and the like. Essentially, such umbrella-type patio tables are comprised of a table top and legs to support the table top in a generally horizontal orientation and an umbrella assembly mounted on a supporting member which extends in a generally vertical orientation through an aperture centrally located in the table top. Typically, the table top of such a table is of generally circular horizontal section and the center aperture through which the umbrella supporting pole member extends is located in the center of the table top. This center aperture and the umbrella supporting pole member are of circular horizontal section and the umbrella supporting pole member is comprised of an upper portion on which the umbrella is mounted and a lower portion which is either affixed to a subterranean anchor or affixed to a weighted pedestal. Typically, the upper and lower portions of the umbrella supporting pole member are tubular sections which are demountably couple together above the table top.

Conventional plant receptacles cannot be positioned centrally on the table top of such tables because the umbrella supporting member extends through the central aperture. A conventional plant receptacle can be positioned only in the peripheral area of the table top, eccentric to the umbrella supporting pole member. Such positioning has the disadvantage that the plant receptacle would occupy useful working area of the table top. Since umbrella-type patio tables are typically of a relatively small size, it is highly desirable to be able to locate a plant receptacle in the central part of the table top to minimize obstruction of the limiting working area of the periphery. Furthermore, a conventional plant receptacle cannot be secured to the table top and it therefore, susceptible to accidental tipping over or toppling off the table when acted upon by a force such as wind or when an individual unintentionally bumps into the table. Further, it would also be susceptible to unauthorized removal and/or theft.

There remains a need for an umbrella planter that may be positioned concentric to and surrounding the umbrella supporting pole member, resulting in a pleasing aesthetic appearance and leaving the peripheral working area of the patio table top essentially unobstructed. In addition, the umbrella planter will be securely engaged in a stable placement so that it cannot be readily tipped over or knocked off the table or readily removed by an unauthorized person. The umbrella planter will also include an upper planter section and a lower water reservoir base section having connecting means for mating with the upper planter section. The umbrella planter will also include desirable features of conventional plant receptacles such as providing a cavity of adequate volume to hold potting soil and plants and/or flowers; and also providing good water drainage into the lower water reservoir base section.

DESCRIPTION OF THE PRIOR ART

Umbrella planters, tree and pole planters, plant containers, vase planters and plant receptacles of various designs, configurations, structures and materials of construction have been disclosed in the prior art. For example, U.S. Pat. No. 4,597,221 to Adair et al discloses a plant receptacle designed to be used in combination with an umbrella-type table and umbrella. The receptacle includes an outer saucer shaped container having a centrally located sleeve aperture opening for receiving the umbrella pole there through.

U.S. Pat. No. 5,493,976 to Hammond discloses a table tray adapted for installation around an umbrella pole of umbrella for use with table. Tray includes a central opening within which the pole is received. The tray can take on a variety of shapes and includes a plurality of interior compartments for receiving such items as flowers or plants.

U.S. Pat. No. 5,967,359 to Mindell discloses a receptacle for use as a plant container. Receptacle includes an upright central locating tube which is attached to an aperture in a recess in its base. Receptacle is suspended on a pole above the table by means of a jubilee clip which encircles and grips spring fingers which extend from the bottom end of the locating tube.

U.S. Pat. No. 5,960,587 to Brasseur, Jr. et at discloses an umbrella planter that is adapted for circling an umbrella pole and resting upon a patio table top and includes a large pot divided into two halves of identical geometry, and a drip tray similarly divided into two halves of identical geometry. Features are provided to lock each drip tray half into a corresponding pot half. Additional features allow each pot half to interlock with each other, thereby forming a complete planter.

U.S. Pat. No. 6,085,459 to Conner discloses a vase container for use with a table umbrella assembly. The vase includes a two part light weight plastic construction where the respective halves are secured to an upright table umbrella pole.

U.S. Pat. No. 5,259,141 to D'Alessandro discloses a tree planter is used for supporting a plurality of plant pots around the trunk of a tree or an umbrella pole of a patio table and includes a plurality of identical, flat segments, each segment forming the arc of a circle having an opening in the middle to support a flower pot.

U.S. Pat. No. 5,638,638 to Moskowitz discloses a flower pot having an accessible watering base. The flower pot includes an upper pot section and a base reservoir section that are mated together to form the flower pot.

None of the aforementioned prior art patents disclose or teach the structures and configurations of the present invention of an umbrella planter having a snap-on base that is adapted with a hollow center sleeve having a central sleeve opening for receiving the umbrella pole of an umbrella assembly and being centrally positioned on the table top of a patio table, such that the planter receptacle is designed to hold and contain plants, flowers, potting soil and water. Additionally, none of the aforementioned umbrella planter includes internal features for the self-wicking of water to the plants, an overflow control of the water, stacking ribs for shipping of multiple units and a stacking spacer for multiple unit displaying.

Accordingly, it is an object of the present invention to provide an umbrella planter having a snap-on lower water reservoir base member that is adopted with a center tube sleeve with a central sleeve opening for receiving the umbrella pole of an umbrella assembly.

Another object of the present invention is to provide an umbrella planter being positioned concentric to and surrounding the umbrella pole and being centrally positioned on the table top of a patio table, such that the umbrella planter is securely engaged around the umbrella pole in order to prevent removing by an unauthorized person, or accidental tipping over or being knocked-off of the patio table.

Another object of the present invention is to provide an umbrella planter that includes an upper planter member having a chamber of adequate volume for containing and holding plants, flowers and potting soil and for providing sufficient water drainage via water venting slots into the lower water reservoir base member.

Another object of the present invention is to provide an umbrella planter that includes a lower water reservoir base member for containing water in its water reservoir chamber, such that the water may be wicked into the potting soil within the upper planter member.

Another object of the present invention is to provide an umbrella planter that includes mating connection means for joining and locking the upper planter member to that of the lower water reservoir base member.

Another object of the present invention is to provide an umbrella planter that includes a plurality of Y-shaped stacking ribs for shipping of multiple units of the upper planter member without the upper planter members sticking with each other.

Another object of the present invention is to provide an umbrella planter that includes a plurality of cylindrically-shaped stacking receptacles for shipping of multiple units of the lower water reservoir base member without the lower base members sticking with each other.

Another object of the present invention is to provide an umbrella planter that includes water receiving means in the form of a funnel into which water may be easily poured to fill the reservoir chamber from any type of watering can, faucet or nozzle, such that the funnel is sufficiently wide and the protruding lip extending outward sufficiently to accommodate any filling device.

Another object of the present invention is to provide an umbrella planter that includes the center tube sleeve having a an inner circular perimeter lip within the central sleeve opening for receiving and holding a large candle therein for use in outdoor or indoor situations.

A further object of the present invention is to provide an umbrella planter having various configurations and aesthetic designs being molded from durable and semi-flexible plastics.

A still further object of the present invention is to provide an umbrella planter that can be mass produced in an automated and economical manner, easy to assembly and use; and is readily affordable by the consumer.

SUMMARY OF THE INVENTION

In accordance with the present invention, there is provided an umbrella planter having a snap-on lower water reservoir base member and a center sleeve tube for use with an umbrella-type patio table having a table top with a centrally located opening for receiving an umbrella pole of an umbrella assembly. The umbrella planter includes an upper planter member and a lower water reservoir base member. The lower water reservoir base member includes a side wall having an upper perimeter lip and a bottom base wall; and includes a hollow center sleeve connected to the bottom base wall and having a central sleeve opening for receiving the umbrella pole there through; and the bottom base wall also includes an upper surface and a lower surface. The upper surface of the bottom base wall of the lower base member includes first connecting means for connecting and mating the lower base member to the upper planter member. The upper planter member includes a side wall having an upper perimeter edge, and a bottom planter wall having a plurality of water ventilation slots; the bottom planter wall has a centralized pedestal section connected thereto; and also the bottom planter wall has an upper surface and a lower surface. The pedestal section includes an inner cylindrical wall forming a sleeve receiving passageway for receiving the hollow center sleeve therein; the inner cylindrical wall having a plurality of downwardly protruding hollow legs being integrally attached thereto. Each of the hollow legs includes second connecting means for connecting and mating with the first connecting means for joining together the upper planter member to the lower base member. The lower surface of the bottom planter wall of the upper planter member includes third connecting means for connecting and mating the upper planter member to the upper perimeter lip of the lower base member. Additionally, each of the hollow legs further include a water receiving opening for allowing water to enter the upper planter member; and a filling funnel for filling water into the lower base member.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein:

FIG. 4 is a top perspective view of the umbrella planter of the present invention showing the upper planter member mated with the snap-on water reservoir base member and having the center tube sleeve of the water reservoir base member protruding through the sleeve tube passageway opening of bottom planter wall of the upper planter member, and the funnel component for receiving water within the umbrella planter;

FIG. 13 is a front perspective view of the umbrella planter of the second embodiment of the present invention showing two umbrella planters being stacked with each other using a stacking spacer and being in operational use thereof;

FIG. 13A is a front perspective view of the umbrella planter of the present invention showing the stacking spacer being positioned over the center tube sleeve of a lower umbrella planter;

FIG. 14 is a top perspective view of the umbrella planter of the second embodiment of the present invention showing the upper planter member mated with the snap-on lower water reservoir base member being in operational use as a candle holder and flower planter;

FIG. 15 is a cross-sectional view of the umbrella planter of the second embodiment of the present invention taken along lines 15—15 of FIG. 14 showing the candle being held within the sleeve tube opening and the inner circular lip of the tapered hollow center sleeve of the snap-on lower base member;

FIG. 16A is a bottom exploded perspective view of the umbrella planter of the second embodiment of the present invention showing the upper planter member having the plurality of square-shaped connector openings for each hollow leg and being mated with the water reservoir base member having the hollow center sleeve and the square-shaped connecting support pads thereon;

FIG. 17A is a bottom exploded perspective view of the umbrella planter of the third embodiment of the present invention showing the upper planter member having the plurality of rectangular-shaped connector openings for each hollow leg and being mated with the water reservoir base member having the hollow center sleeve and the rectangular-shaped connecting support bars thereon;

DETAILED DESCRIPTION OF THE PREFERRED AND ALTERNATE EMBODIMENTS

Overview

Figure 1:
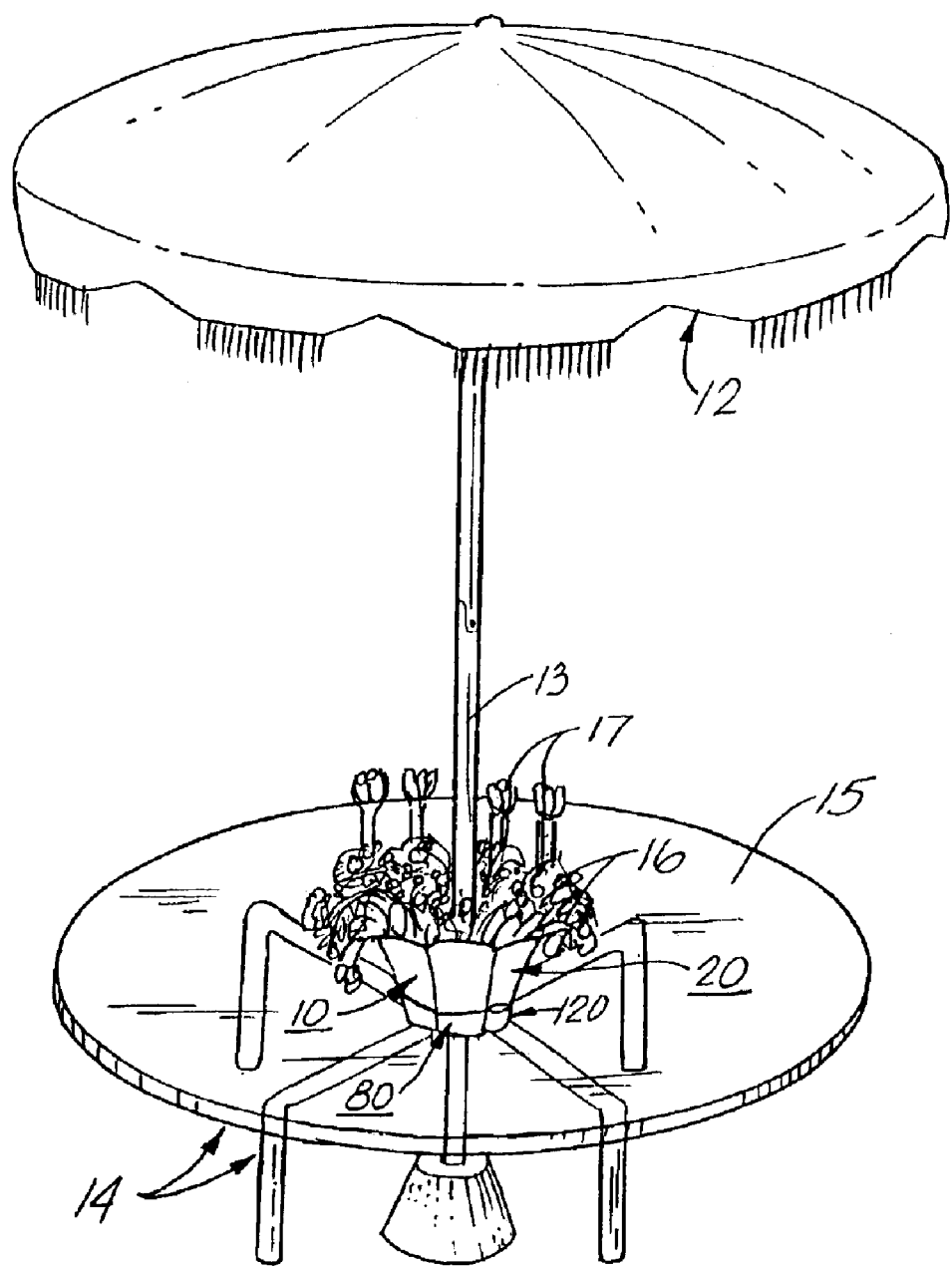
FIG. 1 is a top perspective view of the umbrella planter with a snap-on base on the preferred embodiment of the present invention showing the upper planter member and the snap-on lower water reservoir base member in operational use upon a patio table and umbrella assembly.

The umbrella planters 10, 200, 300, 400, 500, 600, 700, 800 and 900 and their component parts of the preferred and alternate embodiments of the present invention are represented in detail by FIGS. 1 through 23 of the patent drawings. The umbrella planter 10, 200, 300, 400, 500, 600, 700, 800 and 900 includes an upper planter member 20, 220, 320, 420, 520, 620, 720, 820 and 920 for holding an adequate volume of dirt or potting soil 18 for growing of plants 16 and/or flowers 17, and includes a lower water reservoir base member 80, 280, 380, 480, 580, 680, 780, 880 and 980 for holding and containing an adequate amount of water 19 for maintaining the growth of the plants 16 and/or flowers 17. The umbrella planters 10, 200, 300, 400, 500, 600, 700, 800 and 900 is adapted for encircling an umbrella pole 13 for use on a table top 15 of an umbrella-type patio table 14. Each of the umbrella planters 10, 200, 300, 400, 500, 600, 700, 800 and 900 include a centrally located tapered hollow center tubular sleeve 88 having a central sleeve opening 90 for receiving the umbrella pole 13 there through, such that the umbrella planter is centrally positioned on the patio table top 15 of the patio table 14 and the umbrella pole 13 is extended through the central sleeve opening 90 of the planter housing. The upper planter members 20, 220, 320, 420, 520, 620, 720, 820 and 920 and the lower base members 80, 280, 380, 480, 580, 680, 780, 880 and 980 are mated and joined together by the use of the first, second and third connecting means in order to provide two support locking mechanisms, such that these upper and lower members will not readily separate from each other. The second connecting means include a plurality of circular openings, square openings, or rectangular openings for connecting and mating with the first connecting means being the plurality of connecting support pins, connecting support spherical tabs, connecting support pads, or connecting support bars, respectively, for joining together the upper planter member 20, 220, 320, 420, 520, 620, 720, 820 and 920 to that of the lower base member 80, 280, 380, 480, 580, 680, 780, 880 and 980. The third connecting means include a plurality of lip receiving ribs or bars 64 to 72 for adjacently connecting to the upper perimeter lip 84 of the lower base member 80, 280,380, 480, 580, 680, 780, 880 and 980 for additional mating and joining together of the upper planter member to the lower base member. It is understood that the lip receiving ribs 64 to 72 are aligned with the planter side wall 22 of the upper planter member 20 and are also aligned with the saucer (base) side wall 82 of the lower planter member 80. This prevents these planter members 20 and 80 from being distorted during manufacturing and shipping.

Figure 11:
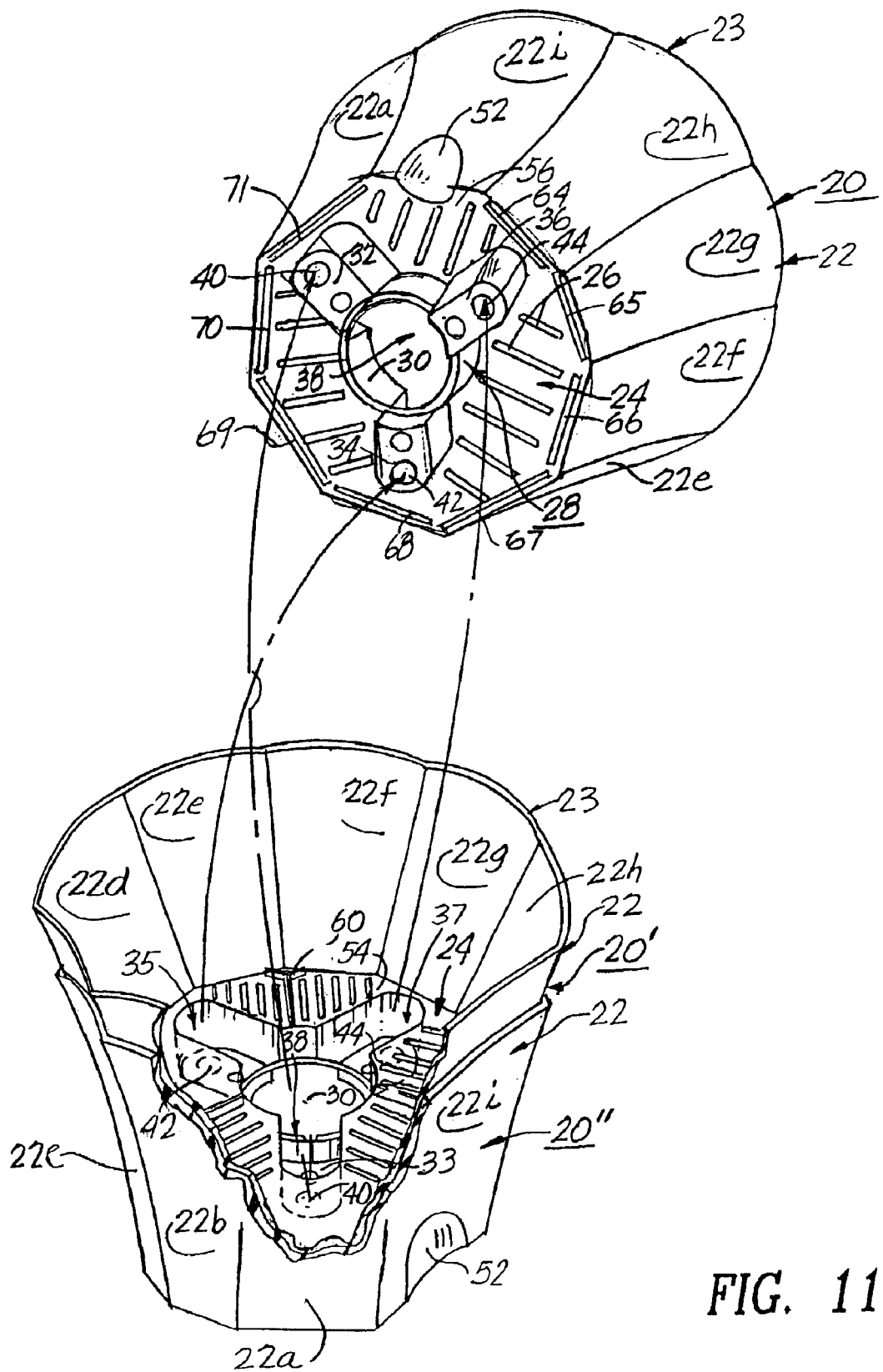
FIG. 11 is a front exploded perspective view of the umbrella planter of the present invention showing a plurality of upper plant members being stacked with each other using the plurality of Y-shaped internal stacking ribs being located on the upper bottom wall surface thereof.
Figure 12:
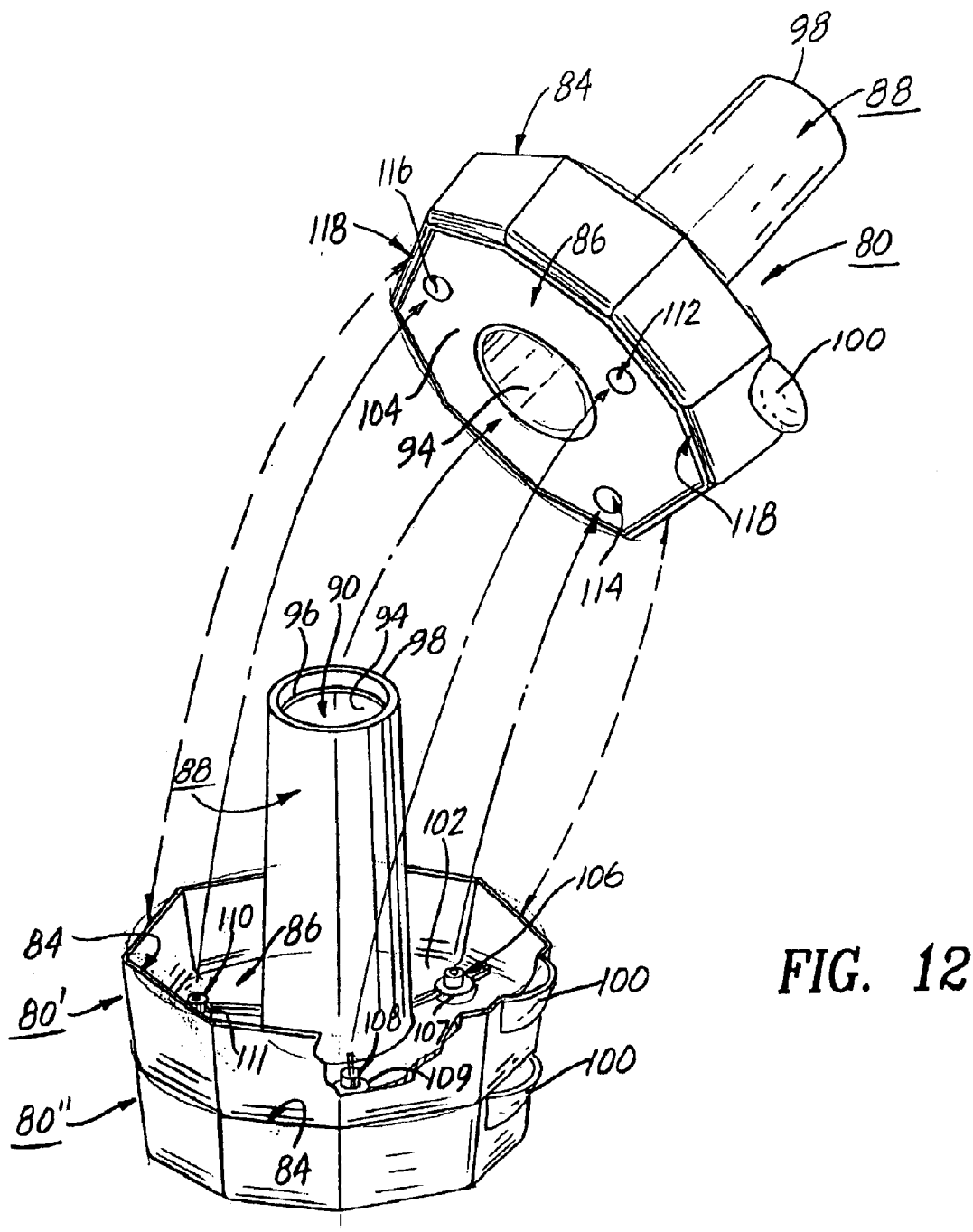
FIG. 12 is a front exploded perspective view of the umbrella planter of the present invention showing a plurality of lower water reservoir base members being stacked with each other using the plurality of cylindrically-shaped stacking receptacles being located on the lower base wall surface of the bottom base wall.

Each of the upper planter members 20, 220, 320, 420, 520, 620, 720, 820 and 920 include first stacking means in the form of stacking ribs, stacking bars, stacking pins or stacking pads for allowing the multiple stacking of two or more upper planter members 20, 20' and 20" together for shipping thereof, as shown in FIG. 11. Also, each of the lower base members 80, 280, 380, 480, 580, 680, 780, 880 and 980 include first connecting means that detachably mate with the second stacking means by having corresponding male and female geometric shapes, respectively. The first connecting means include a plurality of connecting support pins, connecting support pads, connecting support bars, or semi-spherical connecting tabs; and the second stacking means include a corresponding plurality of cylindrically-shaped receptacles, square-shaped compartments, rectangular-shaped channels or semi-spherical sockets, respectively, for the geometrically matching of the first connecting means with that of the second stacking means for allowing the multiple stacking of two or more lower base members 80, 80' and 80" together for shipping thereof, as shown in FIG. 12.

At least two or more of the umbrella planters 10, 200, 300, 400, 500, 600, 700, 800 and 900 can optionally be stacked with each other, when in operational use around an umbrella pole 13 by using one or more stacking spacers 130, as shown in FIG. 13 of the patent drawings. For example, two or more umbrella planters 200 and 200' can be stacked with each other being in operational use with an umbrella pole 13, as depicted by FIG. 13 of the drawings, by using one or more stacking spacer 130. Stacking spacer 130 includes a tubular sleeve section 132 having an upper perimeter lip 134 and having a center opening 136 of stacking spacer 130 is used for receiving the top end 97 of the hollow center sleeve 88 of the lower base member 280 of the lower umbrella planter 200; and the upper perimeter lip 134 and center opening 136 is used for engaging the bottom base wall 286' of the lower base member 280' of the upper umbrella planter 200' and for receiving the umbrella pole 13 there through, respectively, as shown in FIGS. 13 and 13A of the drawings. It is understood that any type of umbrella planter can be used with the stacking spacer 130.

The upper planter member and the lower base member are made from moldable, durable and semi-flexible plastic materials. The stacking spacer 130 is also made from moldable, durable and semi-rigid plastic materials.

Additionally, the upper planter member and lower base member include structural configurations selected from the group consisting of a truncated conical shape, a truncated conical shape having a side wall with a concave shape, a truncated conical shape having a side wall with a convex shape, a cylindrical shape, a square shape, a rectangular shape, a trapezoidal shape, a triangular shape and a polygonal shape, as depicted in the alternate embodiments 200, 300, 400, 500, 600, 700, 800 and 900, as shown in FIGS. 16 through 23 of the drawings.

PREFERRED EMBODIMENT 10

Figure 2:
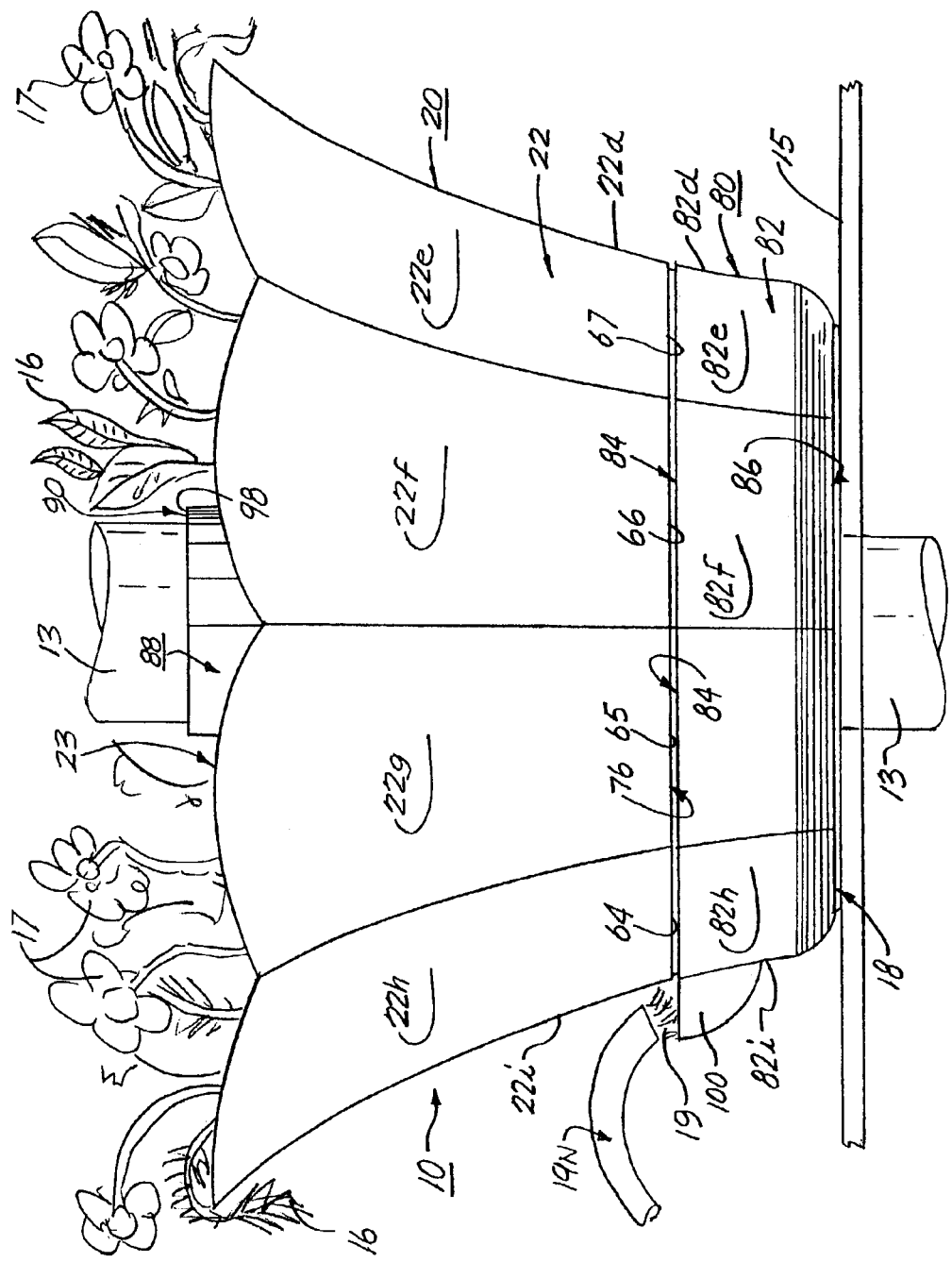
FIG. 2 is a side elevational view of the umbrella planter of the preferred embodiment of the present invention showing the upper planter member mated with the snap-on lower water reservoir base member depicting a spout of a watering can pouring water in the funnel component of the water reservoir base member being in operational use thereof.
Figure 3:
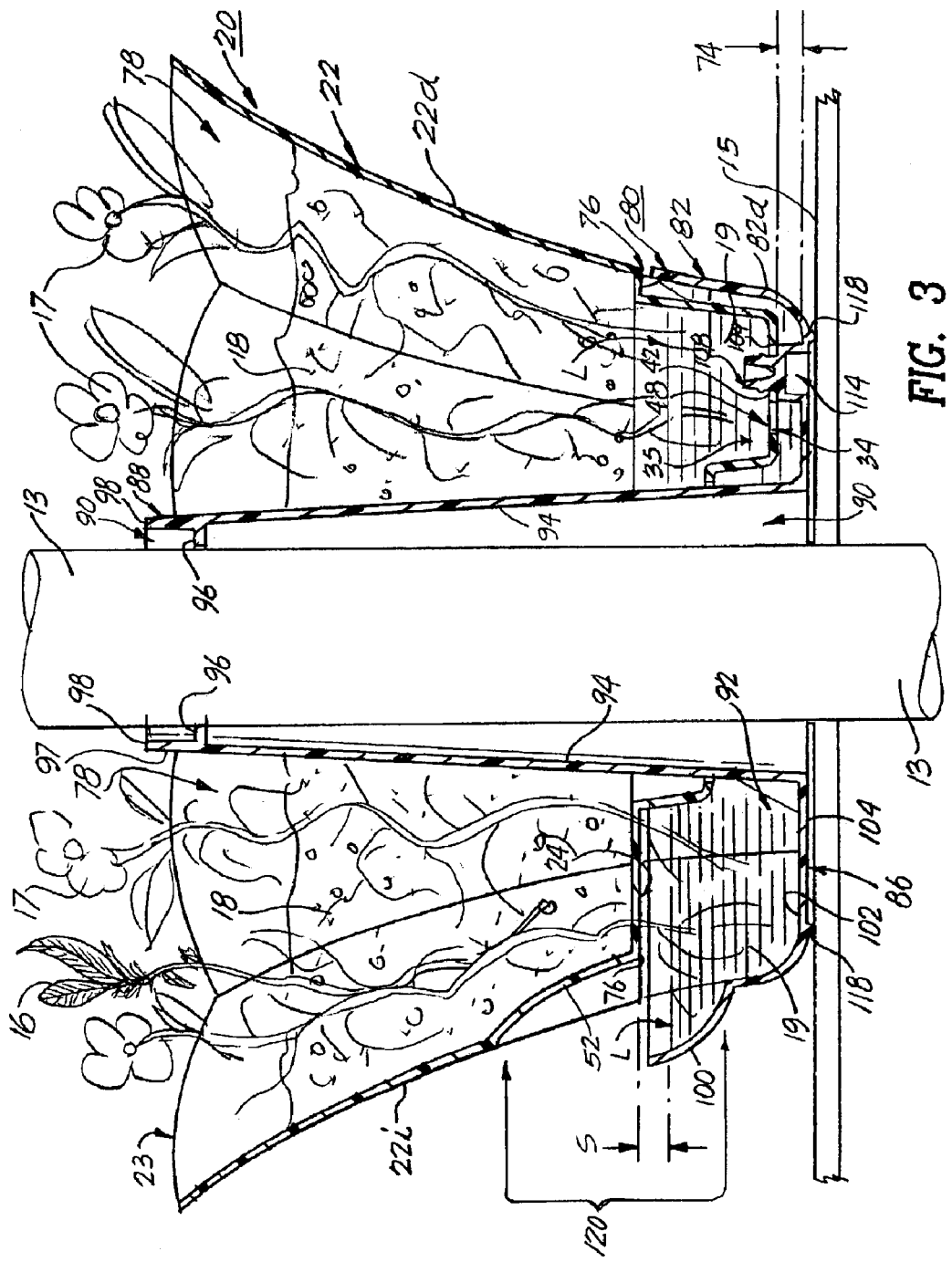
FIG. 3 is a sectional view of the umbrella planter of the present invention showing the upper planter member mated with the snap-on water reservoir base member, the center tube sleeve in receipt of the umbrella pole, one of the downward protruding hollow legs in connection with the corresponding connecting support pin and depicting the water level and the roots of a plant being in the upper planter member.

The umbrella planters 10 and its component parts of the preferred embodiment of the present invention are represented in detail by FIGS. 1 through 13 of the patent drawings. The umbrella planter 10 includes a snap-on lower water reservoir base member 80, as shown in FIGS. 1 to 3 of the drawings, is used for providing the planter receptacle 10 having a centralized tapered hollow center tubular sleeve 88 with a central sleeve opening 90 for receiving an umbrella pole 13 of a patio umbrella 12. The planter receptacle 10 is also used for a centralized placement on the table top 15 of the patio table 14, wherein the planter receptacle 10 can hold and contain plants 16, flowers 17, potting soil 18 and water 19.

Figure 6:
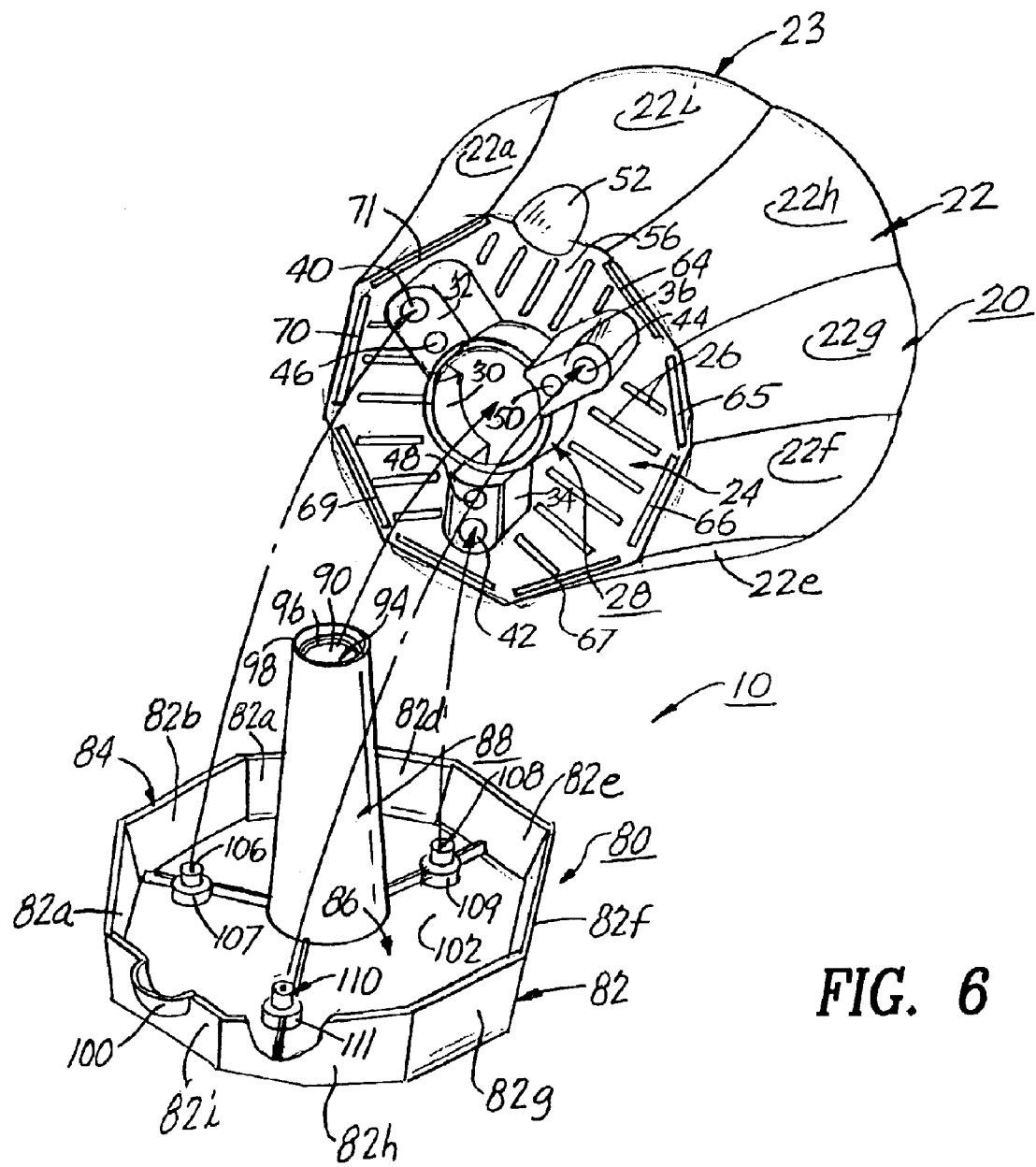
FIG. 6 is a bottom exploded perspective view of the umbrella planter of the present invention showing the upper planter member being mated with the snap-on water reservoir base member.
Figure 7:
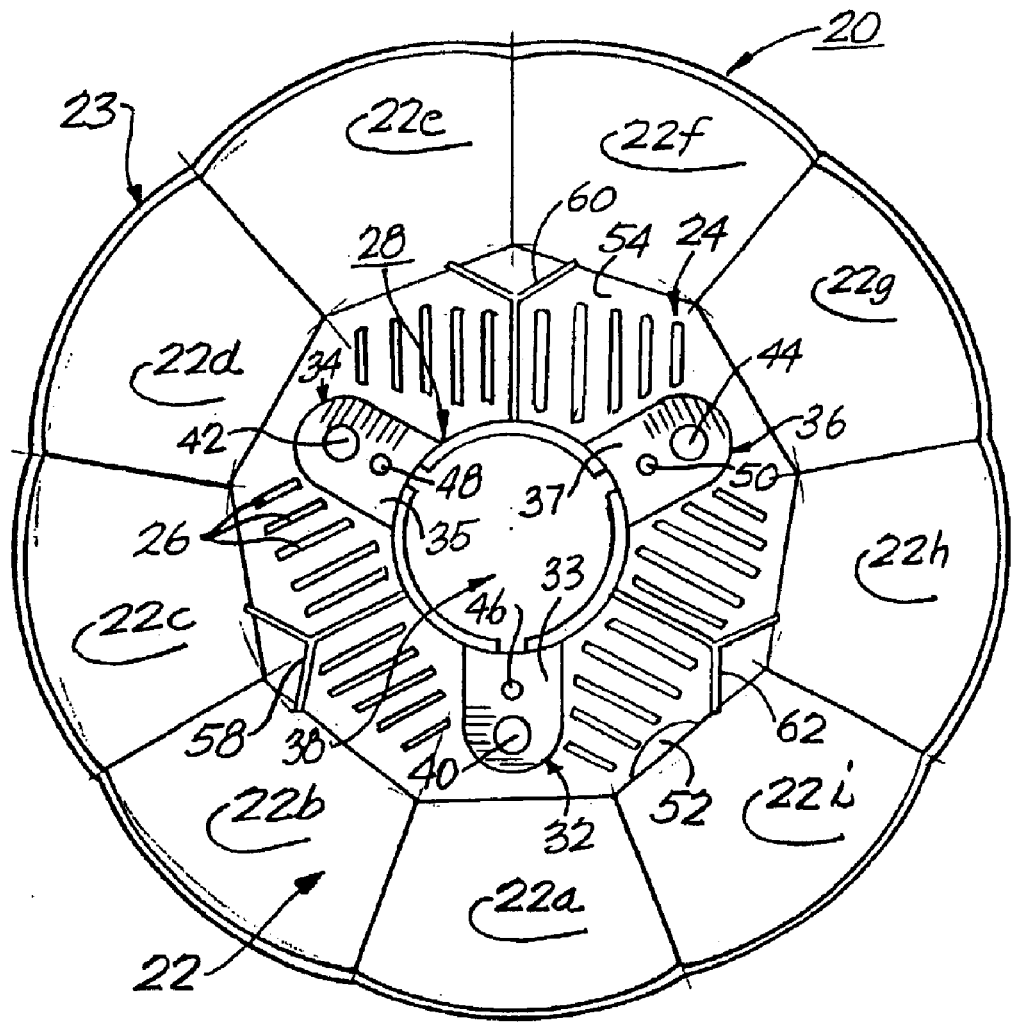
FIG. 7 is a top plan view of the umbrella planter of the present invention showing the upper planter member having a plurality of stacking ribs, a plurality of hollow legs each having a connector opening and a water opening there through, a plurality of water drainage and venting slots, and a sleeve tube passageway opening.
Figure 8:
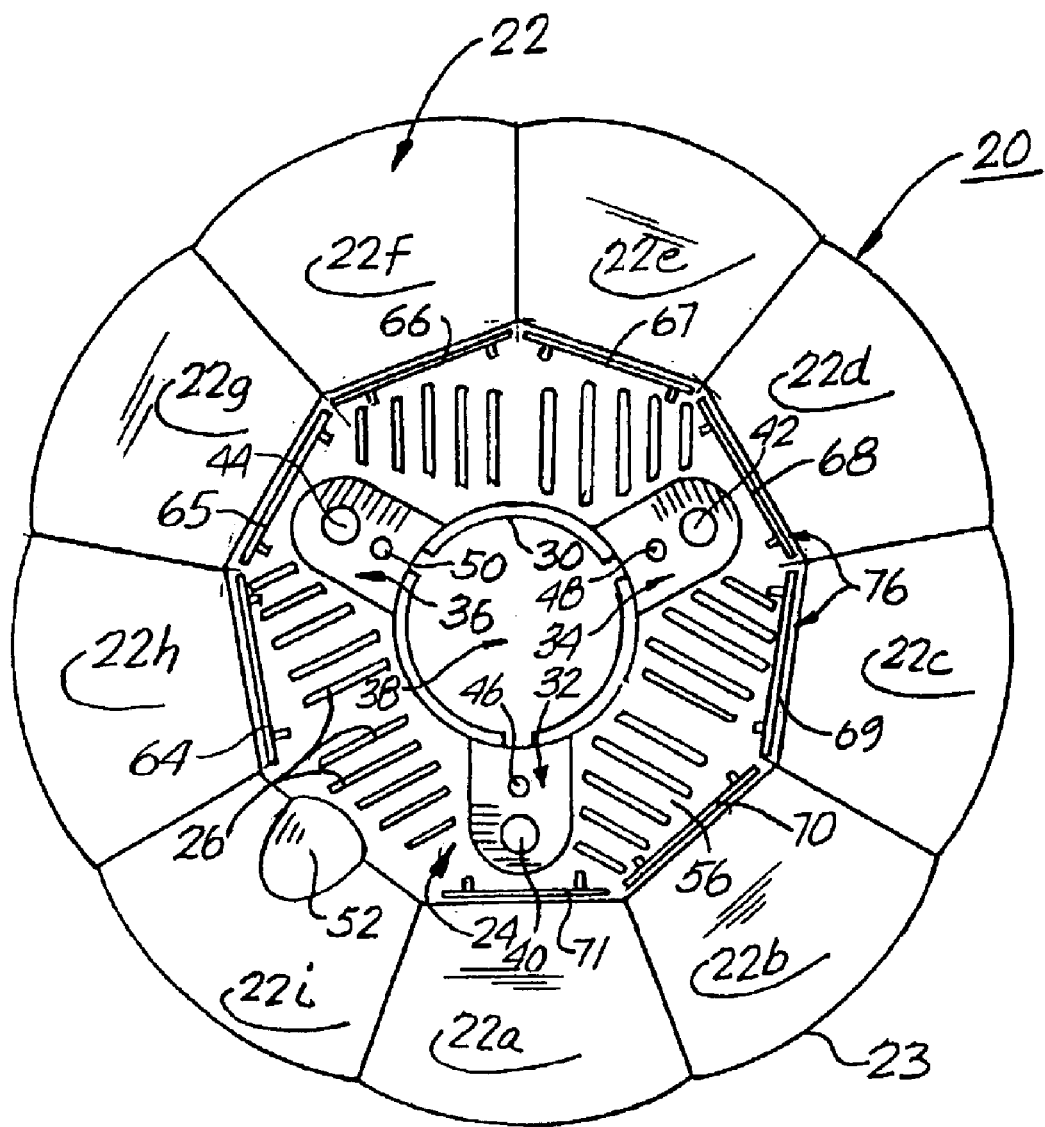
FIG. 8 is a bottom plan view of the umbrella planter of the present invention showing the upper planter member having a plurality of protruding hollow legs being attached to the pedestal section, a plurality of water drainage and venting slots, a plurality of lip receiving ribs, and a sleeve tube passageway opening.
Figure 9:
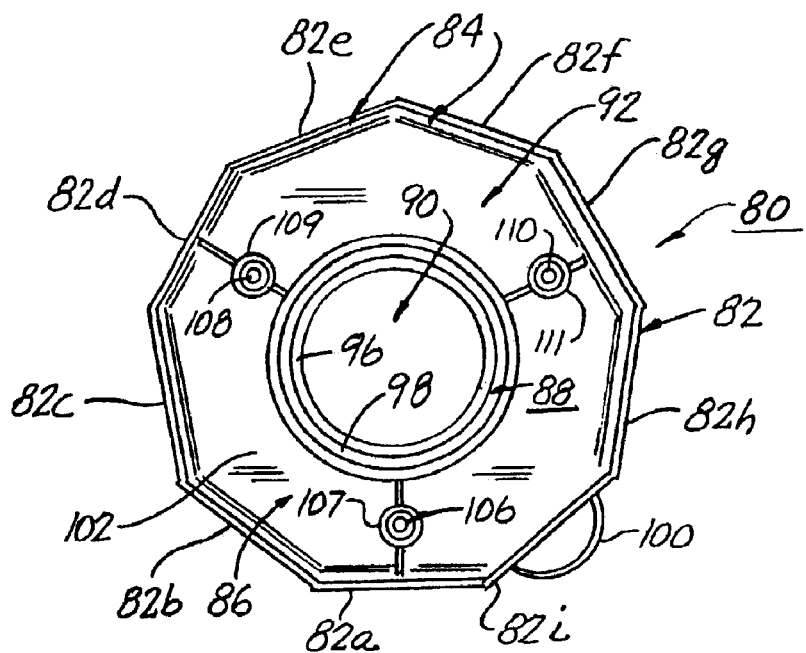
FIG. 9 is top plan view of the umbrella planter of the present invention showing the snap-on lower water reservoir base member having an integrally attached tapered hollow center sleeve with a central sleeve opening, a protruding lip member and a plurality of connecting support pins.

The umbrella planter 10, as shown in FIGS. 1 through 10 of the drawings, includes an upper planter member 20 having a conventionally shaped truncated outer conical side wall 22 (being divided into 9 equal sections 22a to 22i) with an upper circular perimeter edge 23 and an integrally connected bottom planter wall 24 with a plurality of water ventilation slots 26 there through. Integrally extending from the bottom planter wall 24 is a pedestal section 28 having an inner cylindrical wall 30 and having a plurality of hollow legs 32, 34 and 36 being attached and equally spaced apart to the inner cylindrical wall 30. Legs 32, 34 and 36 are arrayed in the configuration of a Y. The legs 32, 34 and 36 of the pedestal section 28 are hollow and thereby provide an interconnected interior chamber area 33, 35 and 37, respectively, connecting within the hollow planting interior area 78 for holding and containing an adequate amount of the potting soil or dirt 18 and for the plant roots 16r to grow therein. Additionally, the inner cylindrical wall 30 of pedestal section 28 forms the sleeve tube passageway opening 38 for receiving the tapered hollow center tubular sleeve 88 there through of the lower water reservoir base member 80. Further, each of the interior chamber areas 33, 35 and 37 of hollow legs 32, 34 and 36 includes a connector opening 40, 42 and 44 and a water receiving opening 46, 48 and 50, respectively, there through, as depicted in FIGS. 7 and 8 of the drawings. Outer conical wall section 22i includes a conically shaped recess indentation 52, as shown in FIGS. 2 to 4 and 8 of the drawings, being the upper part of a funnel component 120.

Bottom planter wall 24 includes an upper bottom wall surface 54 having a plurality of Y-shaped internal stacking ribs 58, 60 and 62 for use in the stacking and shipping of several stacked upper planter members 20, as shown in FIG. 11 of the drawings. Bottom planter wall 24 further includes a lower bottom wall surface 56 having a plurality of lip receiving ribs 64, 65, 66, 67, 68, 69, 70 and 71. Lip receiving ribs 64 to 71 are equally spaced-apart and are adjacent and aligned along the outer circular perimeter edge 76 of the lower bottom wall surface 56.

The umbrella planter 10, as shown in FIGS. 2 to 6, 9 and 10 of the drawings, includes a snap-on lower water reservoir base member 80 for mating with the upper planter member 20 for forming the umbrella planter 10. Lower base member 80 includes a circumferentially closed conical side wall 82 (being divided into 9 equal sections 82a to 82i) having a substantially circular upper lip 84 and an integrally connected bottom base wall 86 having an integrally connected centrally located tapered center tube sleeve 88 with a central sleeve opening 90 therein, thus forming an interior water reservoir chamber 92. Central sleeve opening 90 of the center tube sleeve 88 is used for receiving the pole section 13 of the umbrella assembly 12. Additionally, center tube sleeve 88 includes an inner wall surface 94 having a circular perimeter lip 96 being located and adjacent to the perimeter tube sleeve lip 98. The conical side wall 82 extends upwardly to approximately to the height H of the pedestal section 28 and includes a radially protruding lip 100 being located on conical side wall section 82i, as shown in FIGS. 2 to 6 of the drawings. Protruding lip 100 is the lower part of the funnel component 120 and extends outwardly in the shape of an inverted beak or funnel. The outer conical side wall 82 is of such a heigh H that the base member 82 has the appearance of a shallow pan onto which the upper planter member 20 fits therein.

Figure 10:
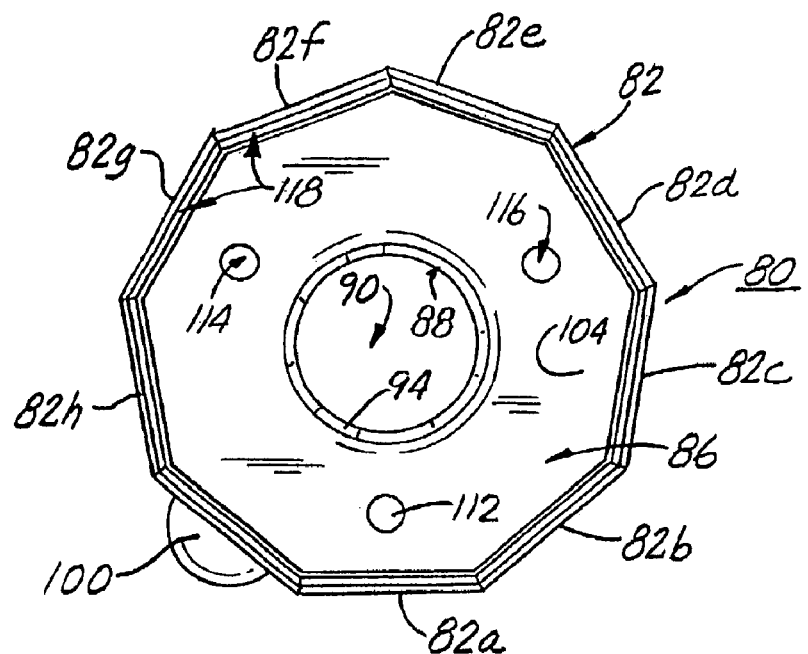
FIG. 10 is a bottom plan view of the umbrella planter of the present invention showing the snap-on lower water reservoir base member having a bottom base wall with a central sleeve opening, a plurality of cylindrically-shaped stacking receptacles and a raised outer perimeter ridge component thereon.

Bottom base wall 86 includes an upper base wall surface 102 having a plurality of cylindrically-shaped support pins 106, 108 and 110 thereon. Support pins 106, 108 and 110 are evenly spaced-apart in a Y-shaped array conforming to the connector openings 40, 42 and 44 of the hollow legs 32, 34 and 36, respectively, of pedestal section 28. For mating the upper planter member 20 to the lower base member 80, the connector openings 40, 42 and 44 then connect and snap onto the cylindrical support pins 106, 108 and 110, respectively, in order to cooperate and lock the upper planter member 20 to the lower base member 80 together. Additionally, mating and attaching of the upper planter member 20 to that of the lower base member 80 is accomplished by the connecting and aligning of the plurality of the lip receiving ribs 64 to 72 with the outer circular perimeter upper lip 84 of the lower base member 80, as depicted in FIGS. 3 and 6 of the drawings. As shown in FIG. 3 of the drawings, the location of support pins 106, 108 and 10 cause the upper planter member 20 to seat above the bottom base wall 86 of the lower base member 80 by a distance 74 equal to the height of each of the support pin bases 107, 109 and 111 of the cylindrically-shaped support pins 106, 108 and 110, respectively. Thus, the water 19 is free to flow within the interior water reservoir chamber 92 formed with the lower water reservoir base member 80 beneath the upper planter member 20. Each of the water receiving openings 46, 48 and 50 within each of the hollow legs 32, 34 and 36, respectively, are of a large enough diameter, at least ¼ inch diameter, to permit water 19 to be absorbed, as by wicking, into the potting soil or dirt 18 and the plant roots 16r are within each of the interior chamber areas 33, 35 and 37 of the hollow legs 32, 34 and 36, respectively, of the pedestal section 28, as depicted in FIG. 3 of the drawings. Bottom base wall 86 further includes a lower base wall surface 104 having a plurality of cylindrically-shaped stacking receptacles 112, 114 and 116 for use in the stacking and shipping of several stacked lower base members 80, as shown in FIG. 12 of the drawings. Lower base wall surface 104 also includes a raised outer perimeter ridge component 118 for engaging the table top 15 of patio table 14, as shown in FIGS. 1, 3 and 10 of the drawings.

The outer conical wall section 22i of the upper planter member 20 includes the formed conically-shaped recess 52 and positioned such that the recess 52 will overlie the protruding lip 100 located on the outer conical side wall section 82i of the lower base member 80 when the upper planter member 20 and lower base member 80 are secured together. As shown in FIGS. 2, 3 and 4, the recess 52 and protruding lip 100 cooperate to form a funnel component 120 into which water 19 may be easily poured to fill the water reservoir 92 from any type of watering can, faucet or nozzle 19N, as shown in FIG. 2. The funnel component 120 is sufficiently wide and the protruding lip 100 extending sufficiently outward to accommodate any type of filling devices. The protruding lip 100, while shown conforming generally to the shape of the recessed depression 52 formed in the side wall section 22i, extends beyond the circular perimeter edges 23 and 76 of the conical side wall 22 of the upper planter member 20, i.e. radius of the lowermost edge 76 of the upper planter section 20 so as to minimize spillage. The shape or even the recessed depression 52 is not critical and may even be dispensed with should the shape of the upper planter member 20 be substantially narrowed at its bottom so that access to the protruding lip 100 is clear. While the shape of the protruding lip 100 or funnel component 120 is like an inverted bird's beak, this too is not critical and it can take any protruding shape. The outer cylindrical wall 30 of the pedestal section 28 are solid with no perforations therein, thereby insuring that water 19 enters each of the interior chamber areas 33, 35 and 37 of hollow legs 32, 34 and 36, respectively, via water openings 46, 48 and 50, respectively, of pedestal section 28. Further, there is a small space S between the bottom planter wall 24 of the upper planter member 20 and the upper perimeter lip edge 84 of the conical side wall 82 of lower water reservoir base member 80. This insures that the water level L is always below the plurality of water ventilation slots 26 formed in the bottom wall 24 of the upper planter member 20.

Figure 16:
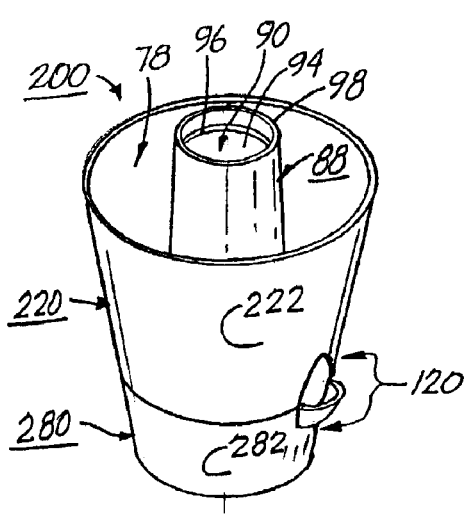
FIG. 16 is a front perspective view of the umbrella planter of the second embodiment of the present invention showing the planter having a truncated conical configuration.
Figure 21:
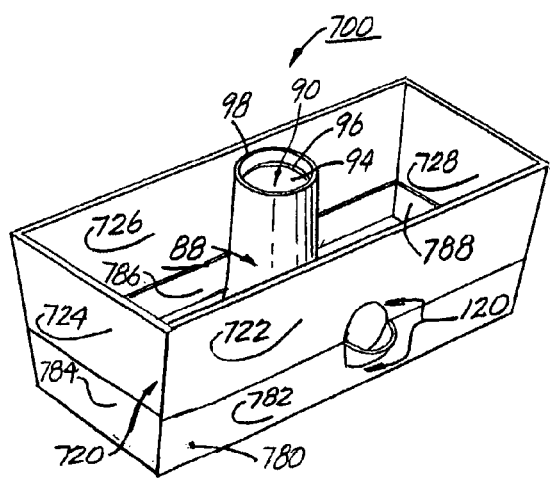
FIG. 21 is a front perspective view of the umbrella planter of the seventh embodiment of the present invention showing the planter having a trapezoidal configuration.
Figure 22:
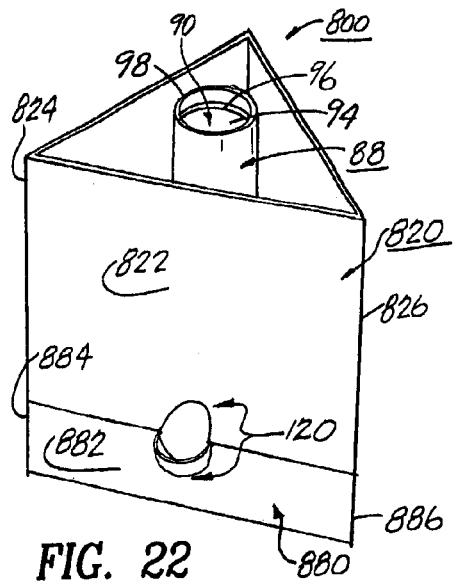
FIG. 22 is a front perspective view of the umbrella planter of the eighth embodiment of the present invention showing the planter having a triangular configuration.

The hollow legs 32, 34 and 36 being a Y-shaped array, as shown in FIGS. 6, 8 and 16, provides good stability and seating because of its tri-form design, but can be replaced by other design arrangements being a cross (+) shape, an X-shape or a pattern of radiating hollow legs, as shown in alternate embodiments 300, 400, 700 and 800 of FIGS. 18, 19, 21 and 22, respectively. Also, the tri-form design of the hollow legs 32, 34 and 36 of the preferred embodiment can be replaced by a hollow cylindrically-shaped ring 832 of the eighth embodiment 800, as shown in FIG. 22 of the drawings.

The upper planter member 20 and lower base member 80 include structural configurations selected from the group consisting of a truncated conical shape, a truncated conical shape having a side wall with a concave shape, a truncated conical shape having a side wall with a convex shape, a cylindrical shape, a square shape, a rectangular shape, a trapezoidal shape, a triangular shape and a polygonal shape, as depicted in the alternate embodiments, as shown in FIGS. 16 through 23 of the drawings.

Figure 4B:
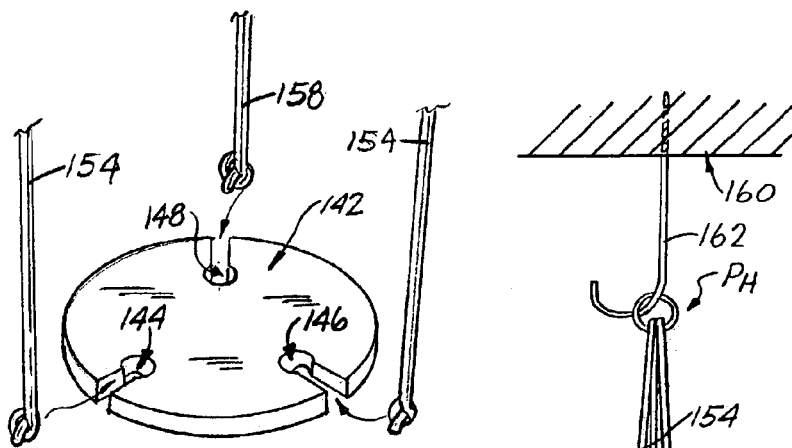
FIG. 4B is a top perspective view of the hanging support disc of the present inventor showing three equally spaced-apart openings each for receiving a hanging rope therein.
Figure 4A:
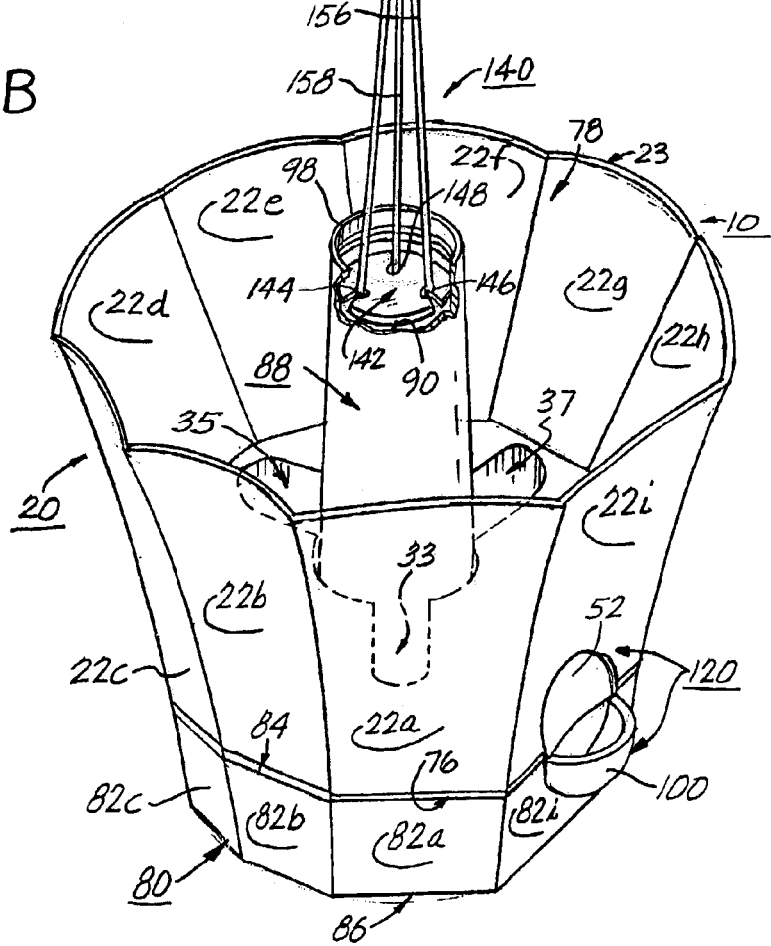
FIG. 4A is a top perspective view of the umbrella planter of the present invention showing a hanging support device within a central sleeve opening of the center tube sleeve for supporting the umbrella planter from a ceiling.
Figure 5:
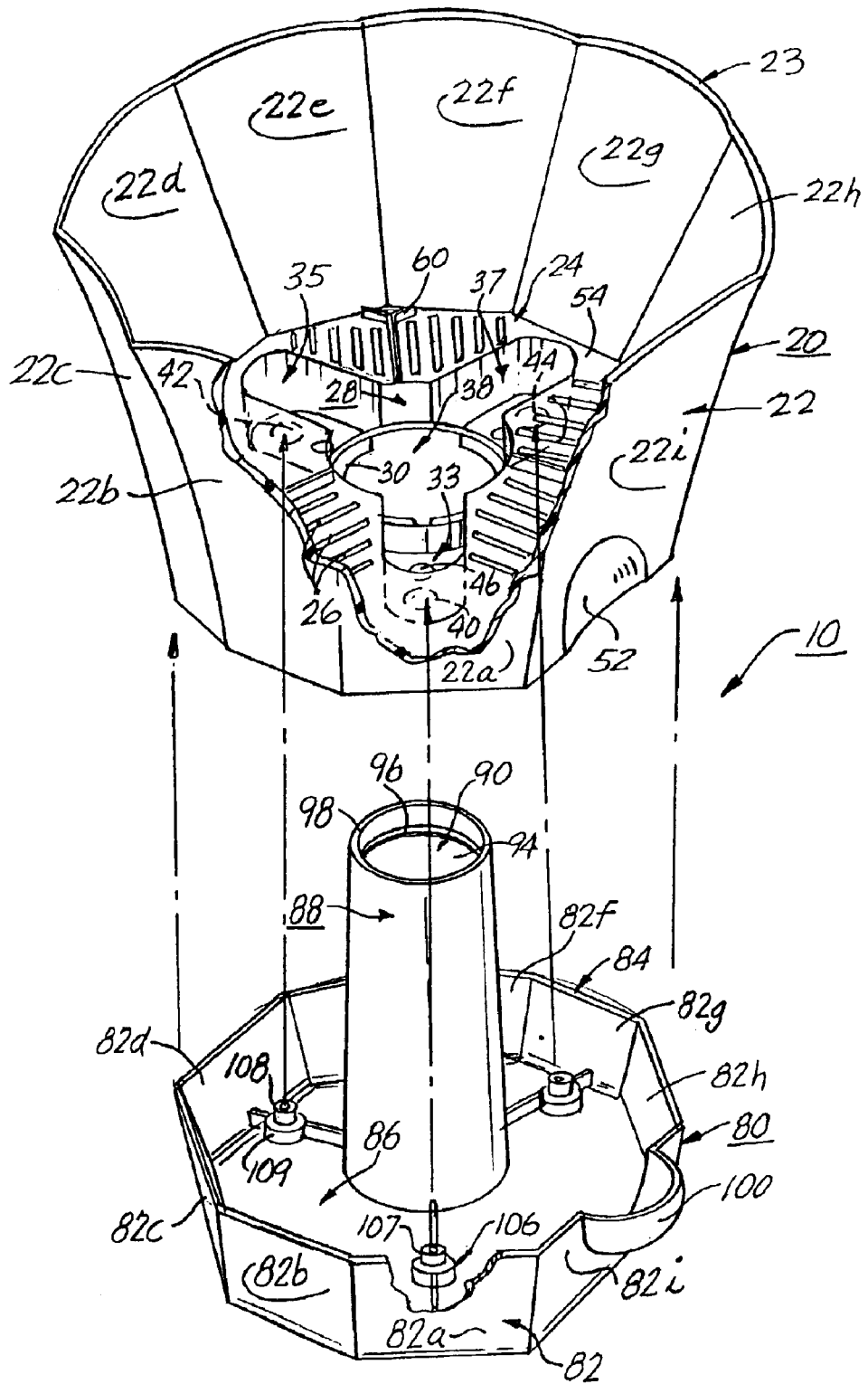
FIG. 5 is a top exploded perspective view of the umbrella planter of the present invention showing the upper planter member having the integrally attached pedestal section with a sleeve tube opening therein, and the snap-on water reservoir base member having the center tube sleeve and cylindrically-shaped connecting support pins thereon.

Additionally, as shown in FIGS. 4A and 4B of the drawings, there is a hanging support device 140 having a hanging support disc member 142. The hanging support disc member 142 includes three-equally spaced-apart receiving openings 144, 146, and 148 being spaced-apart at 120° degree intervals. Each of the receiving opening 144, 146 and 148 are for receiving a hanging rope 154, 156 and 158 therein. The hanging support device 140 having the hanging ropes 154 to 158 attached thereto is used for hanging the umbrella planter 10 from a wall or ceiling 160 using a J-hook 162, as depicted in FIG. 4A, instead of placing the umbrella planter 10 on a table top 15 of table 14(as shown in FIG. 1). It is understood that hanging support disc member 142 can include a plurality of rope receiving openings (4 or more) in alternate designs for the hanging support disc member 142. The hanging support disc member 142 is inserted and horizontally placed within the central sleeve opening 90 of the center tube sleeve 88, as shown in FIG. 4A, in order to support the umbrella planter 10 from a hanging position $P_H$. The hanging support disc member 142, as shown in FIG. 4B is made of durable plastic or lightweight metal materials.

SECOND EMBODIMENT 200

The umbrella planter 200 and its component parts of the second embodiment of the present invention are represented in detail by FIGS. 13 to 16 and 16A of the patent drawings. All aspects of the second embodiment of the umbrella planter 200 are the same as the preferred embodiment of the umbrella planter 10 except for the shape and configuration of the side wall 222 of the upper planter member 220 and also the shape and configuration of the side wall 282 of the lower base member 280 with the overall configuration of the umbrella planter 200 being a truncated conical shape. Another exception is the shape and configuration of the plurality of connector openings 240, 242 and 244 being square-shaped and the shape and configuration of the connecting support pads 290, 292 and 294 being square-shaped, as shown in FIG. 16 of the drawings. The umbrella planter 200 of the second embodiment, as shown in FIGS. 14 and 15 of the drawings, is used for providing the planter receptacle 200 having the centralized tapered center tube sleeve 88 with an inner circular perimeter lip 96 for receiving and holding a large candle 210 therein for use in outdoor or indoor situations. In all other aspects, the umbrella planter 200 is similar in structure and is operable exactly as the preferred embodiment of the umbrella planter 10 of the present invention.

THIRD EMBODIMENT 300

Figure 17:
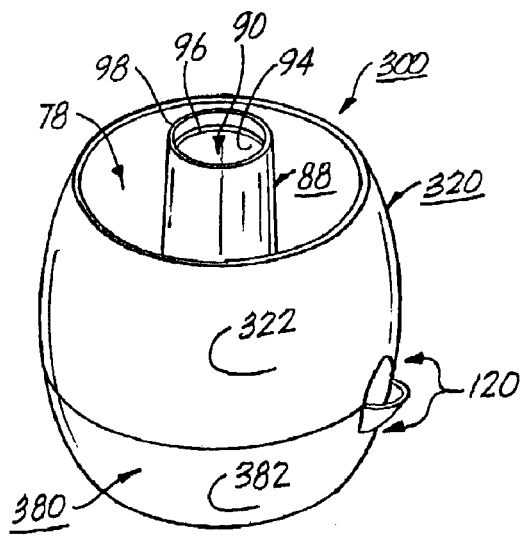
FIG. 17 is a front perspective view of the umbrella planter of the third embodiment of the present invention showing the planter having a truncated conical configuration having a side wall with a concave shape.

The umbrella planter 300 and its component parts of the present invention are represented in detail by FIGS. 17 and 17A of the patent drawings. All aspects of the third embodiment of the umbrella planter 300 are the same as the preferred embodiment of the umbrella planter 10 except for the shape and configuration of the side wall 322 of the upper planter member 320 and also the shape and configuration of the side wall 382 of the lower base member 380 with overall configuration of the umbrella planter 300 being a truncated conical shape having side walls 322 and 382 with a concave shape. Other exceptions are the shape, configuration and array of the plurality of connector openings 340, 342, 344, 346 and 348 being rectangular-shaped within each of the hollow legs 330, 332, 334, 336 and 338 being arrayed in a pattern of radiating legs, and the shape and configuration of the connecting support bars 390, 392, 394, 396 and 398 being rectangularly-shaped and arrayed in pentagonal formation, as shown in FIG. 17 of the drawings. In all other aspects, the umbrella planter is similar in structure and is operable exactly as the preferred embodiment of umbrella planter 10 of the present invention.

FOURTH EMBODIMENT 400

Figure 18:
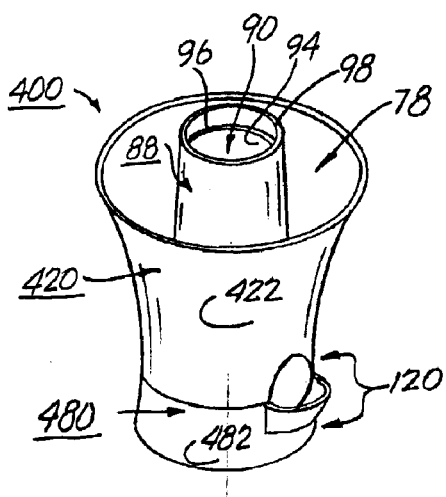
FIG. 18 is a front perspective view of the umbrella planter of the fourth embodiment of the present invention showing the planter having a truncated conical configuration having a side wall with a convex shape.
Figure 18A:
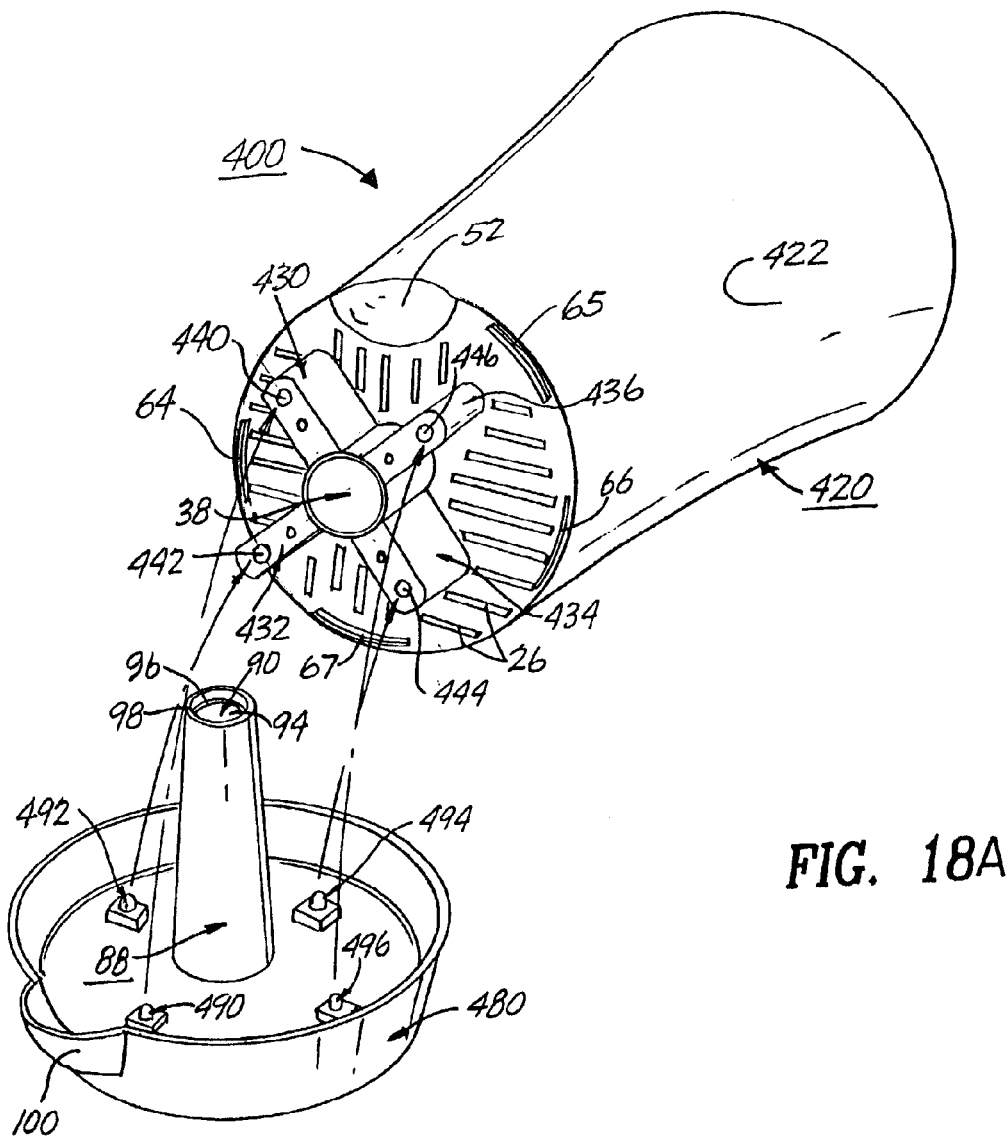
FIG. 18A is a bottom exploded perspective view of the umbrella planter of the fourth embodiment of the present invention showing the upper planter member having a plurality of circular-shaped connector openings for each hollow leg and being mated with the water reservoir base member having the hollow center sleeve and the semi-spherical connecting support tabs thereon.

The umbrella planter 400 and its component parts of the present invention are represented in detail by FIGS. 18 and 18A of the patent drawings. All aspects of the fourth embodiment of the umbrella planter 400 are the same as the preferred embodiment of the umbrella planter 10 except for the shape and configuration of the side wall 422 of the upper planter member 420 and also the shape and configuration of the side wall 482 of the lower base member 480 with overall configuration of the umbrella planter 400 being a truncated conical shape having side walls 422 and 482 with a convex shape. Other exceptions are the shape, configuration and array of the plurality of connector openings 440, 442, 444 and 446 being circular-shaped or oval-shaped within each of the hollow legs 430, 432, 434 and 436 being arrayed in a cross-shaped formation or pattern, and the shape and configuration of the semi-spherical connecting support tabs 490, 492, 494 and 496 being rounded or semi-spherically shaped tab and arrayed in square formation, as shown in FIG. 18A of the drawings. In all other aspects, the umbrella planter is similar in structure and is operable exactly as the preferred embodiment of umbrella planter 10 of the present invention.

FIFTH EMBODIMENT 500

Figure 19:
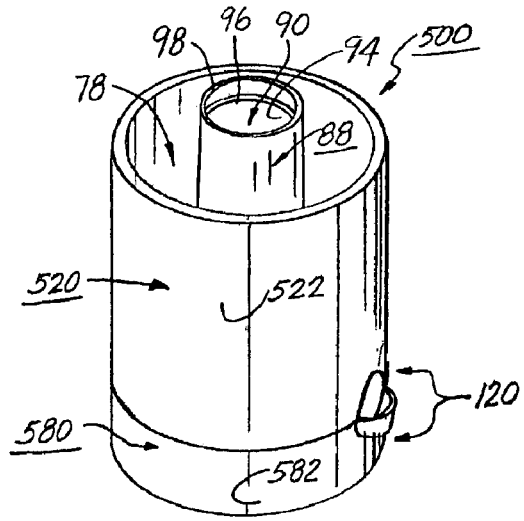
FIG. 19 is a top perspective view of the umbrella planter of the fifth embodiment of the present invention showing the upper planter member mated with the lower planter member having a cylindrical configuration.

The umbrella planter 500 and its component parts of the present invention are represented in detail by FIG. 19 of the patent drawings. All aspects of the fifth embodiment of the umbrella planter 500 are the same as the preferred embodiment of the umbrella planter 10 except for the shape and configuration of the side wall 522 of the upper planter member 520 and also the shape and configuration of the side wall 582 of the lower base member 580 with overall configuration of the umbrella planter 500 being a cylindrically-shaped unit. In all other aspects, the umbrella planter is similar in structure and is operable exactly as the preferred embodiment of umbrella planter 10 of the present invention.

SIXTH EMBODIMENT 600

Figure 20:
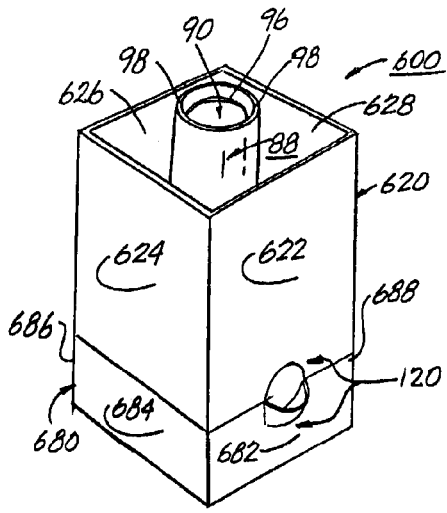
FIG. 20 is a top perspective view of the umbrella planter of the sixth embodiment of the present invention showing the upper planter member mated with the lower planter member.

The umbrella planter 600 and its component parts of the present invention are represented in detail by FIG. 20 of the patent drawings. All aspects of the sixth embodiment of the umbrella planter 600 are the same as the preferred embodiment of the umbrella planter 10 except for the shape and configuration of the side walls 622, 624, 626 and 628 being square-shaped of the upper planter member 620 and also the shape and configuration of the side walls 682, 684, 686 and 688 being rectangularly-shaped of the lower base member 680 with overall configuration of the umbrella planter 600 being an almost cube-shaped unit. In all other aspects, the umbrella planter is similar in structure and is operable exactly as the preferred embodiment of umbrella planter 10 of the present invention.

SEVENTH EMBODIMENT 700

Figure 21A:
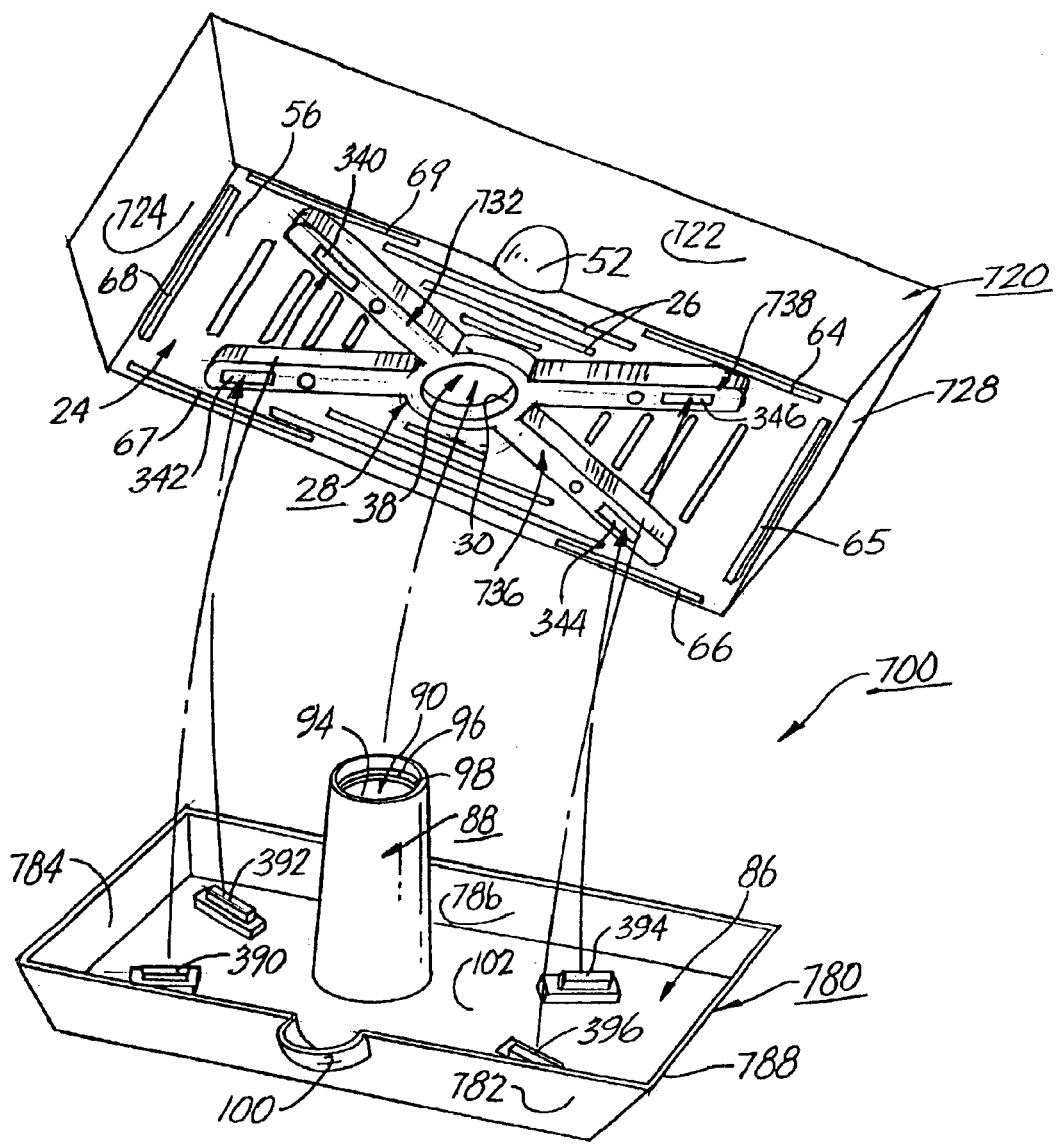
FIG. 21A is a bottom exploded perspective view of the umbrella planter of the seventh embodiment of the present invention showing the upper planter member having the plurality of rectangular-shaped connector openings for each hollow leg and being mated with the water reservoir base member having the hollow center sleeve and the rectangular-shaped connecting support bars thereon.

The umbrella planter 700 and its component parts of the present invention are represented in detail by FIGS. 21 and 21A of the patent drawings. All aspects of the seventh embodiment of the umbrella planter 700 are the same as the preferred embodiment of the umbrella planter 10 except for the shape and configuration of the side walls 722, 724, 726 and 728 being trapezoid-shaped of the upper planter member 720 and also the shape and configuration of the side walls 782, 784, 786 and 788 being trapezoid-shaped of the lower base member 780 with overall configuration of the umbrella planter 700 being a trapezoidal or rectangular shaped unit. Another exception is the shape and configuration of the hollow legs 732, 734, 736 and 738 being in an X-shaped array. In all other aspects, the umbrella planter is similar in structure and is operable exactly as the preferred embodiment of umbrella planter 10 of the present invention.

EIGHTH EMBODIMENT 800

Figures 22A, 22B:
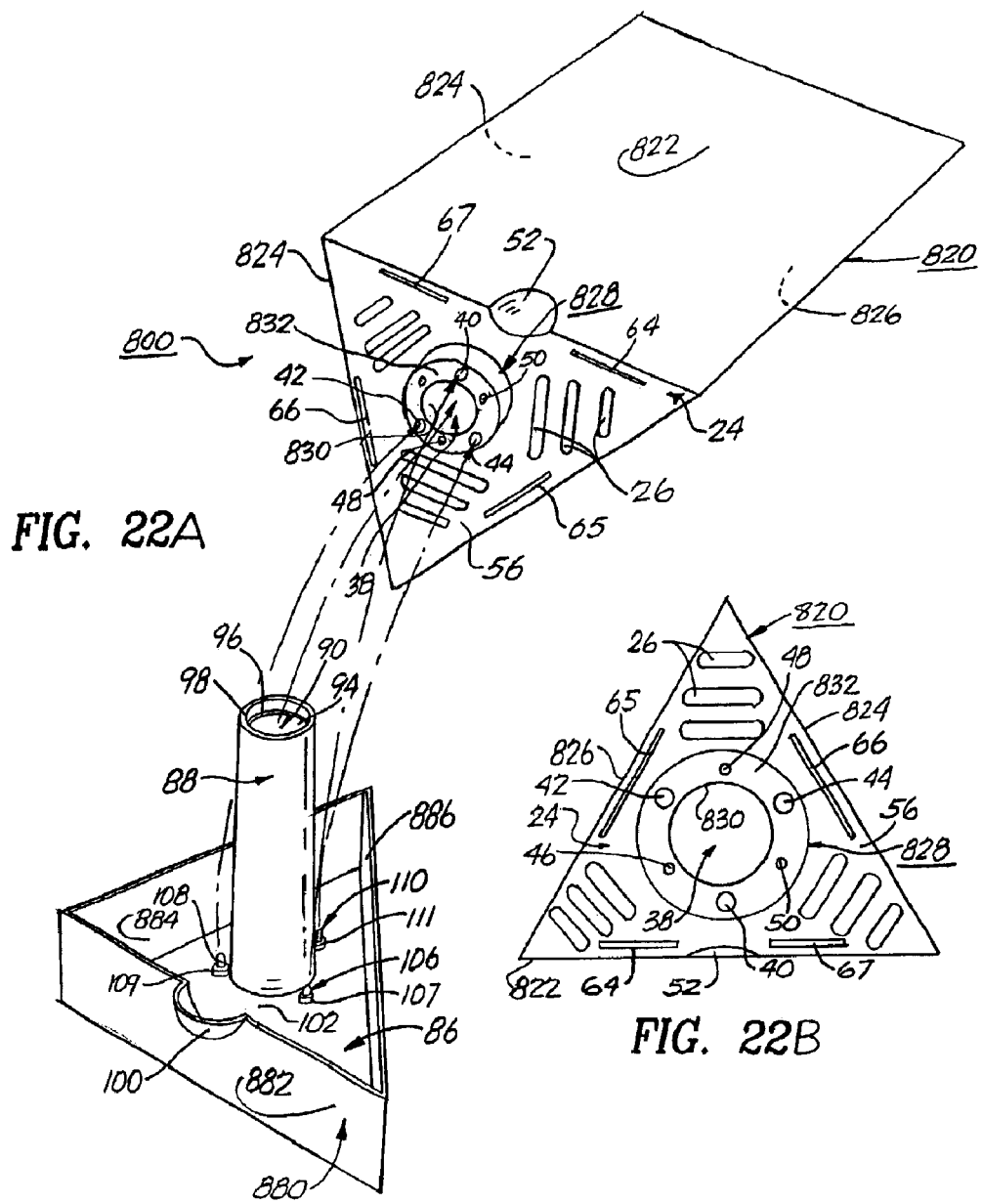
FIG. 22A is a bottom exploded perspective view of the umbrella planter of the eighth embodiment of the present invention showing the upper planter member having a circular pedestal section, an inner cylindrical wall having a sleeve tube opening, and a hollow cylindrically-shaped ring being integrally attached to the inner cylindrical wall; and being mated with the water reservoir base member having the hollow center sleeve and the cylindrically-shaped connecting support pins thereon.
FIG. 22B is a bottom plan view of the umbrella planter of the eighth embodiment of the present invention showing the circular pedestal section of the upper planter member.

The umbrella planter 800 and its component parts of the present invention are represented in detail by FIGS. 22 and 22A of the patent drawings. All aspects of the eighth embodiment of the umbrella planter 800 are the same as the preferred embodiment of the umbrella planter 10 except for the shape and configuration of the side walls 822, 824 and 826 being rectangularly-shaped of the upper planter member 820 and also the shape and configuration of the side walls 882, 884 and 886 being rectangularly-shaped of the lower base member 880 with overall configuration of the umbrella planter 800 being a triangularly-shaped unit for use as a vase for flowers. Another exception is the shape and configuration of the pedestal section 828 being circular in shape and having an inner cylindrically-shaped ring 832 being integrally attached to the inner cylindrical wall 830. In all other aspects, the umbrella planter is similar in structure and is operable exactly as the preferred embodiment of umbrella planter 10 of the present invention.

NINTH EMBODIMENT 900

Figure 23:
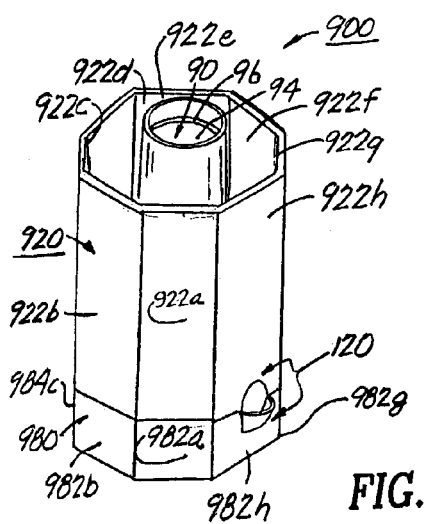
FIG. 23 is a front perspective view of the umbrella planter of the ninth embodiment of the present invention showing the upper planter member mated with the lower planter member having a polygonal configuration.

The umbrella planter 900 and its component parts of the present invention are represented in detail by FIG. 23 of the patent drawings. All aspects of the ninth embodiment of the umbrella planter 900 are the same as the preferred embodiment of the umbrella planter 10 except for the shape and configuration of the side walls 922a to 922h being rectangularly-shaped of the upper planter member 920 and also the shape and configuration of the side walls 982a to 982h being square-shaped of the lower base member 980 with overall configuration of the umbrella planter 900 being an octagonally-shaped unit. In all other aspects, the umbrella planter is similar in structure and is operable exactly as the preferred embodiment of umbrella planter 10 of the present invention.

OPERATION OF THE PRESENT INVENTION

An operation, all of the umbrella planters 10, 200, 300, 400, 500, 600, 700, 800 and 900 of the preferred and alternate embodiments, as shown in FIGS. 1 to 3, 5 and 16 to 23 of the patent drawings, operate in a similar manner. The user starts with an empty upper planter member 20, where then they initially add a sufficient amount of dirt or potting soil 18 within the hollow planting interior area 78. The user now inserts a plurality of plants 16 and/or flowers 17 into the potting soil 18. In the next step, the user now mates and joins together the upper planter member to that of the lower water reservoir base member 80 via the first, second and third connecting means, as shown in FIGS. 3 and 6 to 9 of the drawings. In joining the upper planter member 20 and lower base member 80 together, the plurality of connector openings 40, 42 and 44 (second connecting means) mate with the correspondingly located plurality of cylindrically-shaped connecting support pins, respectively for a first locking mechanism. An additional, second locking mechanisms is simultaneously occurring, when the plurality of lip receiving ribs or bars 64 to 72 on the lower surface 56 of the upper planter member 20 adjacently connect to the upper perimeter lip 84 of the lower base member 70. The first and second locking mechanism provide a firmer locking together of the upper planter member 20 to that of the lower base member.

The user now positions the umbrella planter 10 having plants 16 and/or flowers 17 therein to a central position on the table top surface 15 of patio table 14, such that the center sleeve opening 90 of the bottom base wall 86 of the lower base member 80 is aligned with the table top opening 15a of patio table 14. The user now places the umbrella pole 13 of the patio umbrella 12 through the top end 97 of the center sleeve opening 90 of the hollow center sleeve 88 and through the table top opening 15a of patio table 14.

The user now fills water 19 into the interior water reservoir chamber 92 of the lower base member 80 via the funnel component 120 by various watering devices. The water 19 in the water reservoir chamber 92 will seep upward by wicking through the plurality of water openings 46, 48 and 50 of pedestal section 28 in order to feed the plant roots 16r of plants 16, as depicted in FIG. 3 of the drawings. Thus, the amount of water 19 in the water reservoir chamber 92 will not over soak the plants 16 and/or flowers 17 and the water reservoir chamber 92 can be kept filled to its full capacity, thereby providing several days' or weeks' supply of water 19 at one time. If by chance water 19 is poured directly into the top planting area 78 of the upper planter member 20, all excess water 19 will run through the potting soil 18 and drop into the water reservoir chamber 92 of the lower base member 80 via the plurality of water venting slots 26 in the bottom planter wall 24 of the upper planter member 20. Since all of the water 19 in the water reservoir chamber 92 is free to flow as a single body, as shown in FIG. 3, its water level L is clearly visible by the user looking into the protruding lip 100 or into the funnel component 120 by it with the recess depression 52.

Optionally, for example, if the user would like an additional umbrella planter 200', in use around umbrella pole 13, the user would employ a stacking spacer 130 to separate and stack an upper umbrella planter 200' from a lower umbrella planter 200, as shown in FIGS. 13 and 13A. The stacking spacer 130 when used would provide enough head room $H_R$ distance between the lower and upper umbrella planters 200 and 200', respectively, as not to interfere with the growth or aesthetic appearance of the plants 16 and flowers 17 within the lower umbrella planter 10. This stacking step is accomplished by having the center opening 136 of stacking spacer 130 being used for receiving the top end 97 of the hollow-center sleeve 88 of the lower base member 80 of the lower umbrella planter 10 which provides sufficient head room distance $H_R$ between umbrella planters 200 and 200'; and the upper perimeter lip 134 and center opening 136 is used for engaging the bottom base wall 286' of the lower base member 280' of the upper umbrella planter 200' and for receiving the umbrella pole 13 there through, respectively, as shown in FIG. 13 of the drawings.

ADVANTAGES OF THE PRESENT INVENTION

Accordingly, an advantage of the present invention is that it provides for an umbrella planter having a snap-on lower water reservoir base member that is adopted with a center tube sleeve with a central sleeve opening for receiving the umbrella pole of an umbrella assembly.

Another advantage of the present invention is that it provides for an umbrella planter being positioned concentric to and surrounding the umbrella pole and being centrally positioned on the table top of a patio table, such that the umbrella planter is securely engaged around the umbrella pole in order to prevent removing by an unauthorized person, or accidental tipping over or being knocked-off of the patio table.

Another advantage of the present invention is that it provides for an umbrella planter that includes an upper planter member having a chamber of adequate volume for containing and holding plants, flowers and potting soil and for providing sufficient water drainage via water venting slots into the lower water reservoir base member.

Another advantage of the present invention is that it provides for an umbrella planter that includes a lower water reservoir base member for containing water in its water reservoir chamber, such that the water may be wicked into the potting soil within the upper planter member.

Another advantage of the present invention is that it provides for an umbrella planter that includes mating connection means for joining and locking the upper planter member to that of the lower water reservoir base member.

Another advantage of the present invention is that it provides for an umbrella planter that includes a plurality of Y-shaped stacking ribs for shipping of multiple units of the upper planter member without the upper planter members sticking with each other.

Another advantage of the present invention is that it provides for an umbrella planter that includes a plurality of cylindrically-shaped stacking receptacles for shipping of multiple units of the lower water reservoir base member without the lower base members sticking with each other.

Another advantage of the present invention is that it provides for an umbrella planter that includes water receiving means in the form of a funnel into which water may be easily poured to fill the reservoir chamber from any type of watering can, faucet or nozzle, such that the funnel is sufficiently wide and the protruding lip extending outward sufficiently to accommodate any filling device.

Another advantage of the present invention is that it provides for an umbrella planter that includes the center tube sleeve having a an inner circular perimeter lip within the central sleeve opening for receiving and holding a large candle therein for use in outdoor or indoor situations.

A further advantage of the present invention is that it provides for an umbrella planter having various configurations and aesthetic designs being molded from durable and semi-flexible plastics.

A still further advantage of the present invention is that it provides for an umbrella planter that can be mass produced in an automated and economical manner, easy to assembly and use; and is readily affordable by the consumer.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An umbrella planter having a snap-on lower water reservoir base member and a center sleeve tube for use with an umbrella-type patio table having a table top with a centrally located opening for receiving an umbrella pole of an umbrella assembly, comprising:

a) said umbrella planter including an upper planter member and a lower water reservoir base member;

b) said lower water reservoir base member including a side wall having an upper perimeter lip and a bottom base wall;

c) a hollow center sleeve connected to said bottom base wall and having a central sleeve opening for receiving the umbrella pole therethrough; said bottom base wall including an upper surface and a lower surface;

d) said upper surface of said bottom base wall of said lower base member including first connecting means for connecting and mating said lower base member to said upper planter member;

e) said upper planter member including a side wall having an upper perimeter edge, and said upper planter having a bottom wall with a plurality of water and ventilation slots therein; said bottom wall having a centralized pedestal section connected thereto; said bottom planter wall having an upper surface and a lower surface;

f) said upper surface of said bottom wall of said upper planter member includes first stacking means for allowing the multiple stacking of said upper planter member with other upper planter members;

g) said first stacking means includes a plurality of stacking elements on said upper planter member for passing into a plurality of corresponding stacking openings on other upper planter members for nesting in order to allow for the multiple stacking of said upper planter member with said other upper planter members;

h) said pedestal section includes an inner cylindrical wall forming a sleeve receiving passageway for receiving said hollow center sleeve therein; said inner cylindrical wall having a plurality of downwardly protruding hollow legs being integrally attached thereto;

i) each of said hollow legs includes second connecting means for connecting and mating with said first connecting means for joining together said upper planter member to said lower base member;

j) said lower surface of said bottom planter wall of said upper planter member includes third connecting means for connecting and mating said upper planter member to said upper perimeter lip of said lower base member;

k) each of said hollow legs further include a water receiving opening for allowing water to enter said upper planter member; and l) filling means for filling water into said lower base member.

2. An umbrella planter in accordance with claim 1, wherein said lower surface of said bottom base wall of said lower base member includes second stacking means for allowing the multiple stacking of said lower base member with other lower base members.

3. An umbrella planter in accordance with claim 2, wherein said first connecting means detachably mate with said second stacking means by having corresponding male and female geometric shapes, respectively.

4. An umbrella planter in accordance with claim 3, wherein said first connecting means include a plurality of connecting support pins, connecting support pads, connecting support bars, or semi-spherical connecting tabs; and said second stacking means include a corresponding plurality of cylindrically-shaped receptacles, square-shaped compartments, rectangular-shaped channels or semi-spherical sockets, respectively, for the geometrically matching of said first connecting means with said second stacking means for allowing the multiple stacking of said lower base member with said other lower base members.

5. An umbrella planter in accordance with claim 1, wherein said second connecting means include a plurality of circular openings, square openings, or rectangular openings for connecting and mating with said plurality of said connecting support pins or said connecting support spherical tabs; said connecting support pads; or said connecting support bars, respectively, for joining together said upper planter member to said lower base member.

6. An umbrella planter in accordance with claim 1, wherein said upper planter member includes a hollow interior planting area of sufficient volume for holding and containing potting soil or dirt and the plant roots of flowers or plants to grow therein.

7. An umbrella planter in accordance with claim 1, wherein each of said downwardly protruding hollow legs include an interior chamber area for containing potting soil or dirt and plant roots of flowers or plants to grow therein.

8. An umbrella planter in accordance with claim 7, wherein each of said water receiving openings in each of said protruding hollow legs are of sufficient diameter being of at least ½ inch to permit water from said interior water reservoir chamber to be absorbed by wicking into the potting soil or dirt, and the plant roots within each of said interior chamber areas.

9. An umbrella planter in accordance with claim 1, wherein said first connecting means include a support base for creating a space between each of said protruding hollow legs and said bottom base wall for forming an interior water reservoir chamber being the height of said support base.

10. An umbrella planter in accordance with claim 1, wherein said filling means are formed from a recess indentation on said side wall of said upper planter member being in alignment with a protruding lip of said side wall of said lower base member to cooperate for forming a funnel component for filling water into said lower water reservoir base member from any type of watering can, faucet or nozzle.

11. An umbrella planter in accordance with claim 10, wherein said funnel component is sufficiently wide and said protruding lip extending sufficiently outward to accommodate any type of filling devices.

12. An umbrella planter in accordance with claim 1, wherein said hollow center sleeve has a top end and a bottom end, said top end has a diameter smaller than the diameter of said bottom end, such that said hollow center sleeve tapers outwardly from said top end to said bottom end for allowing the multiple stacking of said hollow center sleeve with other hollow center sleeves of other lower base members.

13. An umbrella planter in accordance with claim 12, wherein said top end of said hollow center sleeve is above the level of said upper perimeter edge of said upper planter member preventing excess water or potting soil from entering said hollow center sleeve.

14. An umbrella planter in accordance with claim 12, wherein said hollow center sleeve includes an inner wall surface; said inner wall surface includes an inner perimeter lip located adjacent to said top end of said hollow center sleeve for mounting a candle on said perimeter lip.

15. An umbrella planter in accordance with claim 12, further including a stacking spacer having an upper perimeter lip and having a center opening for allowing the multiple stacking of said umbrella planter with that of other umbrella planter; said center opening of said stacking spacer for receiving said top end of said hollow center sleeve of said other umbrella planter; and said upper perimeter lip and said center opening for engaging said bottom base wall of said lower base member of said umbrella planter and for receiving the umbrella pole therethrough, respectively.

16. An umbrella planter in accordance with claim 15, wherein said stacking spacer is molded from durable, semi-rigid plastic materials.

17. An umbrella planter in accordance with claim 1, wherein said bottom planter wall of said upper planter member and said upper perimeter lip of said side wall of said lower base member defines an air space for insuring that the water level in said lower base member is always below said plurality of water ventilation slots of said bottom planter wall of said upper planter member.

18. An umbrella planter in accordance with claim 1, wherein said upper planter member and said lower base member are molded from durable, semi-flexible plastic materials.

19. An umbrella planter in accordance with claim 1, wherein said upper planter member has a structural configuration selected from the group consisting of a cylindrical shape, a truncated conical shape, a truncated conical shape having a side wall with a concave shape, a truncated conical shape having a side wall with a convex shape, a triangular shape, a square shape, a trapezoidal shape, a rectangular shape and a polygonal shape.

20. An umbrella planter in accordance with claim 1, wherein said plurality of downwardly protruding hollow legs are arrayed in an evenly spaced-apart configuration about said inner cylindrical wall of said pedestal section.

21. An umbrella planter in accordance with claim 20, wherein said spaced-apart configuration includes a Y-shaped, an X-shaped, a cross (+)-shape, and a pattern of radiating legs.

22. An umbrella planter in accordance with claim 1, wherein said first connecting means and said second connecting means are arrayed in an evenly spaced-apart configuration conforming with each other.

23. An umbrella planter in accordance with claim 1, wherein said first stacking means includes a plurality of stacking ribs, stacking bars, stacking pins or stacking pads on said upper planter member for passing into a plurality of corresponding stacking rib openings, stacking bar openings, stacking pin openings or stacking pad openings on other upper planter members for nesting in order to allow for the multiple stacking of said upper planter member with said other upper planter members.

24. An umbrella planter having a snap-on lower water reservoir base member and a center sleeve tube for use with an umbrella-type patio table having a table top with a centrally located opening for receiving an umbrella pole of an umbrella assembly, comprising:
 a) said umbrella planter including an upper planter member and a lower water reservoir base member;
 b) said lower water reservoir base member including a side wall having an upper perimeter lip and a bottom base wall;
 c) a hollow center sleeve connected to said bottom base wall and having a central sleeve opening for receiving the umbrella pole therethrough; said bottom base wall including an upper surface and a lower surface; said central sleeve opening of said hollow center sleeve is higher than said upper perimeter edge of said upper planter member in order to prevent dirt and water from entering said hollow center sleeve and in which to prevent dirt and water from coming onto the patio table;
 d) said upper surface of said bottom base wall of said lower base member including first connecting means for connecting and mating said lower base member to said upper planter member;
 e) said upper planter member including a side wall having an upper perimeter edge, and a bottom planter wall having a plurality of water ventilation slots; said bottom planter wall having a centralized pedestal section connected thereto; said bottom planter wall having an upper surface and a lower surface;
 f) said pedestal section includes an inner cylindrical wall forming a sleeve receiving passageway for receiving said hollow center sleeve therein; said inner cylindrical wall having a plurality of downwardly protruding hollow legs being integrally attached thereto;
 g) each of said hollow legs includes second connecting means for connecting and mating with said first connecting means for joining together said upper planter member to said lower base member;
 h) said lower surface of said bottom planter wall of said upper planter member includes third connecting means for connecting and mating said upper planter member to said upper perimeter lip of said lower base member;
 i) each of said hollow legs include a water receiving opening for allowing water to enter said upper planter member; and
 j) filling means for filling water into said lower base member.

25. An umbrella planter in accordance with claim 24, wherein said central sleeve opening of said hollow center sleeve, further includes a hanging support device for supporting said umbrella planter from a ceiling or a wall surface.

26. An umbrella planter in accordance with claim 24, wherein said hanging support device includes a hanging support disc having three or more spaced-apart receiving openings each for receiving a hanging rope therein.

27. An umbrella planter having a snap-on lower water reservoir base member and a center sleeve tube for use with an umbrella-type patio table having a table top with a centrally located opening for receiving an umbrella pole of an umbrella assembly, comprising:
 a) said umbrella planter including an upper planter member and a lower water reservoir base member;
 b) said lower water reservoir base member including a side wall having an upper perimeter lip and a bottom base wall;
 c) a hollow center sleeve connected to said bottom base wall and having a central sleeve opening for receiving the umbrella pole therethrough; said bottom base wall including an upper surface and a lower surface;
 d) said upper surface of said bottom base wall of said lower base member including first connecting means for connecting and mating said lower base member to said upper planter member;
 e) said upper planter member including a side wall having an upper perimeter edge, and a bottom planter wall having a plurality of water ventilation slots; said bottom planter wall having a centralized pedestal section connected thereto; said bottom planter wall having an upper surface and a lower surface;
 f) said pedestal section includes an inner cylindrical wall forming a sleeve receiving passageway for receiving said hollow center sleeve therein; said inner cylindrical wall having a plurality of downwardly protruding hollow legs being integrally attached thereto;
 g) each of said hollow legs includes second connecting means for connecting and mating with said first connecting means for joining together said upper planter member to said lower base member;
 h) said lower surface of said bottom planter wall of said upper planter member includes third connecting means for connecting and mating said upper planter member to said upper perimeter lip of said lower base member;
 i) said third connecting means include a plurality of lip receiving ribs or bars for adjacently connecting to said upper perimeter lip of said lower base member for additional mating and joining together of said upper planter member to said lower base member;
 j) each of said hollow legs further include a water receiving opening for allowing water to enter said upper planter members; and
 k) filling means for filling water into said lower base member.

28. An umbrella planter having a snap-on lower water reservoir base member and a center sleeve tube for use with an umbrella-type patio table having a table top with a centrally located opening for receiving an umbrella pole of an umbrella assembly, comprising:
 a) said umbrella planter including an upper planter member and a lower water reservoir base member;
 b) said lower water reservoir base member including a side wall having an upper perimeter lip and a bottom base wall;
 c) a hollow center sleeve connected to said bottom base wall and having a central sleeve opening for receiving the umbrella pole therethrough; said bottom base wall including an upper surface and a lower surface;
 d) said upper surface of said bottom base wall of said lower base member including first connecting means for connecting and mating said lower base member to said upper planter member;
 e) said upper planter member having a bottom planter wall; said bottom planter wall having a centralized pedestal section connected thereto; said bottom planter wall having an upper surface and a lower surface;
 f) said pedestal section includes an inner cylindrical wall forming a sleeve receiving passageway for receiving said hollow center sleeve therein; said inner cylindrical wall having a plurality of downwardly protruding hollow legs being integrally attached thereto;

g) each of said hollow legs includes second connecting means for connecting the mating with said first connecting means for joining together said upper planter member to said lower base member;

h) said lower surface of said bottom planter wall of said upper planter member includes third connecting means for connecting and mating said upper planter member to said upper perimeter lip of said lower base member; and i) said planter member including first stacking means for being stackable together with other of said upper planter members having said first stacking means to form a first stack, and said lower base member including second stacking means for being stackable together with other of said lower base members having said second stacking means to form a second stack; said first and second stacks being separate stacks.

* * * * *